United States Patent [19]

Hagimae et al.

[11] Patent Number: 5,034,991

[45] Date of Patent: Jul. 23, 1991

[54] CHARACTER RECOGNITION METHOD AND SYSTEM

[75] Inventors: Kinuyo Hagimae, Yokohama; Seiji Hata, Fujisawa; Souichi Yano, Yachiyo, all of Japan

[73] Assignees: Hitachi, Ltd., Tokyo; Hitachi Keiyo Engineering Co., Ltd., Chiba, both of Japan

[21] Appl. No.: 505,586

[22] Filed: Apr. 6, 1990

[30] Foreign Application Priority Data

Apr. 10, 1989 [JP] Japan .................................. 1-88065

[51] Int. Cl.⁵ ............................................. G06K 9/62
[52] U.S. Cl. ...................................... 382/30; 382/34; 382/36; 382/37; 382/38
[58] Field of Search .................... 382/21, 37, 38, 3, 11, 382/13, 30, 34, 36, 39

[56] References Cited

U.S. PATENT DOCUMENTS 4,718,103  1/1988  Shojima et al. .......................... 382/3
4,905,295  2/1990  Sato ....................................... 382/21

OTHER PUBLICATIONS

D. Paul et al., "Vista", IEEE Transaction on Pattern Analysis and Machine Intelligence, vol. 10, May, 1988, pp. 399–407.

Primary Examiner—Leo H. Boudreau
Attorney, Agent, or Firm—Antonelli, Terry, Stout & Kraus

[57] ABSTRACT

Character recognition method and system in which a character indicated in a printed, stamped, carved or other form is two-dimensionally imaged and stored as image data and the stored image data is subjected to an image processing to recognize the character. The recognition of the character is performed in such a manner that each time the comparison of plural kinds of feature vectors extracted from the character to be recognized and a dictionary vector of each candidate character in a group of candidate characters preliminarily prepared is made for one of the plural kinds of feature vectors, a candidate character having its dictionary vector away from the extracted feature vector by a distance not smaller than a predetermined value is excluded from the candidate character group. The dictionary vector for each candidate character is defined as an average vector for a variety of fonts. A difference between the dictionary vector and the feature vector extracted from the character to be recognized is estimated by virtue of a deviation vector for the variety of fonts to produce an estimated value. The exclusion from the candidate character group is judged on the basis of the estimated values each of which is cumulatively produced each time the estimation for the difference is made.

20 Claims, 22 Drawing Sheets

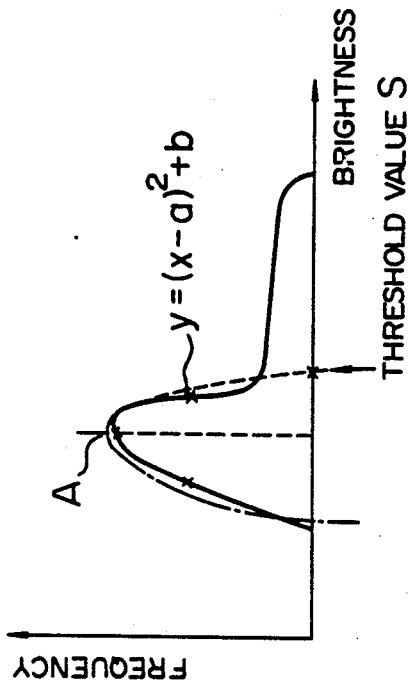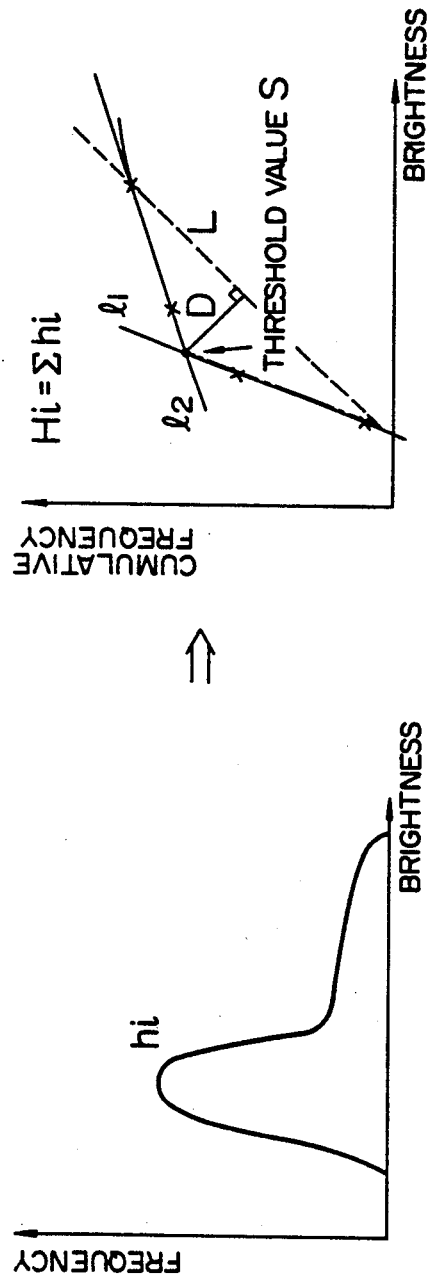
FIG. 9
FIG. 10A
FIG. 10B

DIRECTION OF PROJECTION

SMALLER THAN PREDETERMINED WIDTH

POSITION OF MINIMUM POINT

FIG. 19
| 3 × 5 DIVISION | ASPECT RATIO | 2 × 4 DIVISION | LONGITUDINAL STRUCTURE VECTOR |
|---|---|---|---|
|  |  |  |  |
| LATERAL STRUCTURE VECTOR | RIGHT / LEFT AREA DIFFERENCE | LONGITUDINAL INTERSECTION NUMBER | MAXIMUM LATERAL STRUCTURE VECTOR |
| 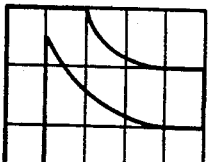 | 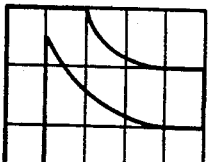 | 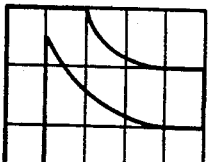 | 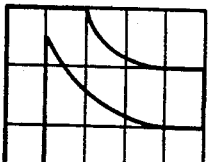 |
| LEFT RECESSED AREA | RIGHT RECESSED AREA | LEFT AND UPPER CORNER AREA | LONGITUDINAL STRUCTURE VECTOR DIFFERENCE |
|  |  |  |  |

F I G. 20
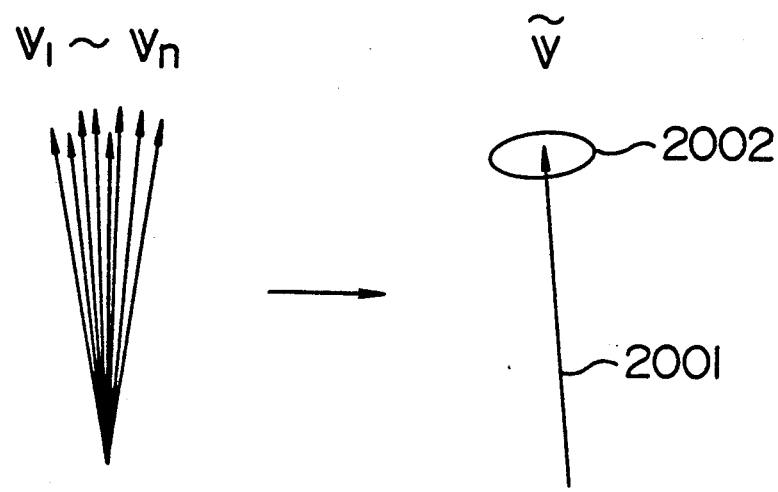
F I G. 23
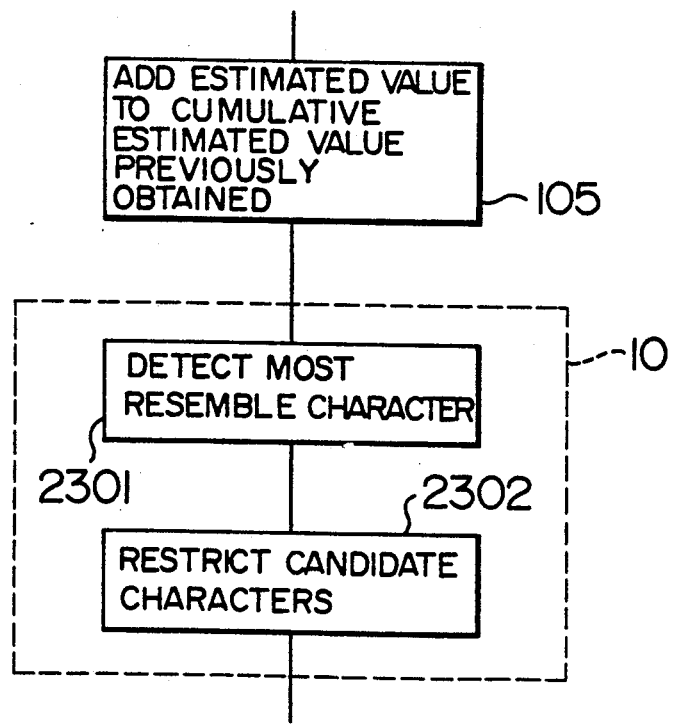

FIG. 21
FEATURE VECTOR α:
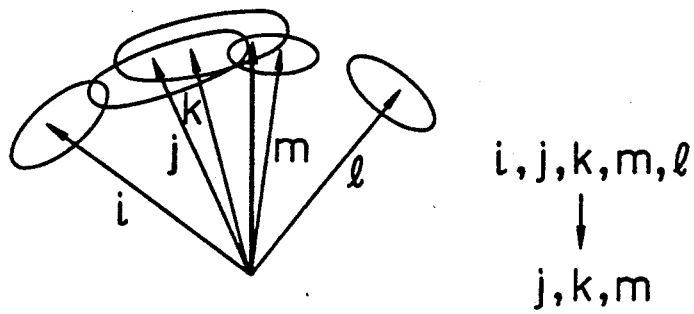
i, j, k, m, ℓ
↓
j, k, m
FEATURE VECTOR β:
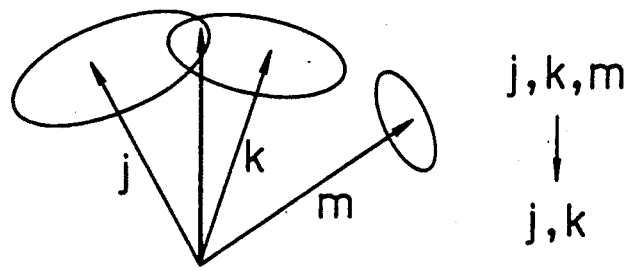
j, k, m
↓
j, k
FEATURE VECTOR γ:
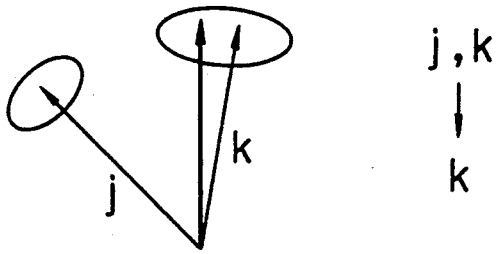
j, k
↓
k F I G. 22
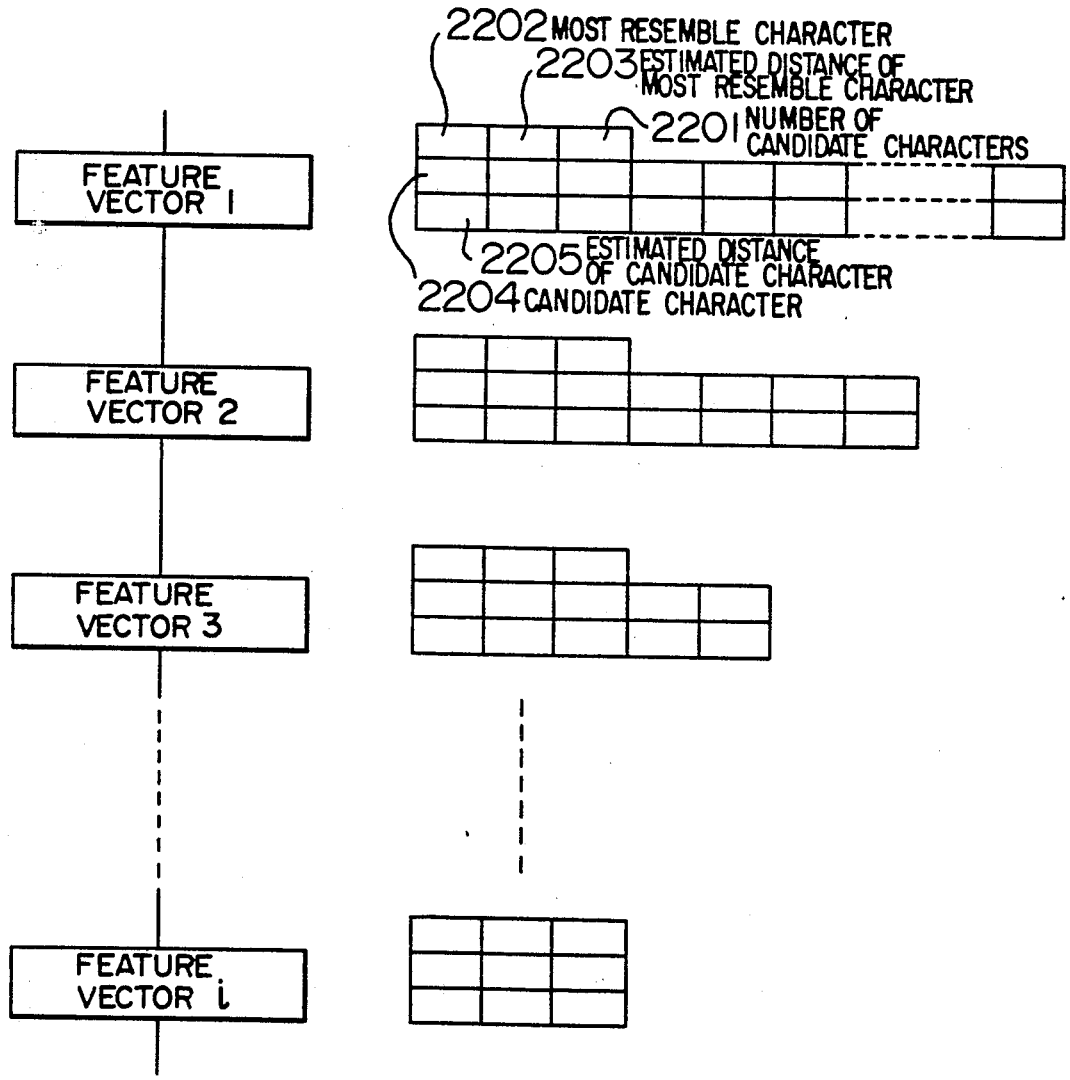

FIG. 22A
```
               1  2  3  4  5  6  7  8  9  0     INITIAL ESTIMATED
              (0)(0)(0)(0)(0)(0)(0)(0)(0)(0)    VALUE
                            ↘
               1  2  3  4  5  6  7̸  8  9  0     1ST CUMULATIVE
             (245)(188)(65)(306)(197)(221)(463)(108)(182)(244)   ESTIMATED VALUE
                         ↗
               1̸  2  3  5  4̸  6  8  9  0        2ND CUMULATIVE
             (598)(188)(65)(197)(408)(221)(108)(182)(244)   ESTIMATED VALUE
                      ↗
                  2  3  5  6̸  8  9̸  0           3RD CUMULATIVE
                (307)(122)(312)(362)(207)(347)(401)   ESTIMATED VALUE
                         ↗
                     2̸  3  5̸  8                 4TH CUMULATIVE
                   (574)(219)(529)(179)          ESTIMATED VALUE
```
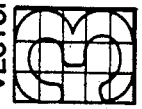 3×5 DIVISION VECTOR
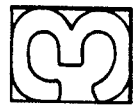 ASPECT RATIO VECTOR
 2×4 DIVISION VECTOR
 RIGHT/LEFT AREA DIFFERENCE VECTOR

FIG. 25

| RECOGNITION CODE DESIGNATOR | DESIGNATED CONTENTS |
|---|---|
| H | COMPANY CODE (ALPHABET); RESTRICTION DOWN TO ONE CHARACTER |
| h | COMPANY CODE (ALPHABET); RESTRICTION DOWN TO TWO OR THREE CHARACTERS |
| N | NUMERAL; RESTRICTION DOWN TO ONE CHARACTER |
| n | NUMERAL; RESTRICTION DOWN TO TWO OR THREE CHARACTERS |
| A | ALPHABET; RESTRICTION DOWN TO ONE CHARACTER |
| a | ALPHABET; RESTRICTION DOWN TO TWO OR THREE CHARACTERS |
| S | SYMBOL; RESTRICTION DOWN TO ONE CHARACTER |

| h | h | N | N | A | A | N | N | A | 2601 |

RECOGNITION CODE DESIGNATOR a

RECOGNITION CODE DESIGNATOR N

CHARACTER RECOGNITION METHOD AND SYSTEM

BACKGROUND OF THE INVENTION

The present invention relates to a character recognition method and system for recognizing a (typical or stereotyped) character(s), numeral(s), symbol(s) or the like indicated in a printed, stamped, carved or other form on the surface of industrial products, for example, electronic parts such as IC's. The invention relates more particularly to such a character recognition method and system in which a character and/or a row of characters can be satisfactorily recognized even when a character is broken into plural parts or swelled to be contiguous to an adjacent character and/or the row of characters is inclined. Throughout the specification and the appended claims, the term "character", is used as a general term for not only a so-called character or letter such as a letter of the alphabet (alphabetic characters), but also indicates a numeral (numeric character), a symbol (symbolic character) and so on.

In the prior art, a character is recognized depending upon a shape peculiar to that character, as disclosed by, for example, JP-A-55-157078. Also, a hand-written character is usually recognized on the basis of the strokes extracted therefrom.

However, in the hitherto known character recognition method, no special attention is paid to the case where characters having different fonts (styles and/or sizes) coexist, the case where a character involves some deflects in marking such as the breakage into plural parts or the contiguous swelling to an adjacent character, and/or the case where a row of characters is inclined. In the case where the characters of different fonts exist, dictionary data corresponding to a variety of fonts and hence a large-capacity memory for storage of such dictionary data is required, which means that a lot of time is taken for collation with the dictionary data. On the other hand, in the case where the character is broken or swelled or the row of characters is inclined, there may be a fear that the impossibility of recognition or an erroneous recognition is encountered.

SUMMARY OF THE INVENTION

A first object of the present invention is to provide a character recognition method and system in which it is not necessary to prepare dictionary data in correspondence to a variety of fonts and the row of characters can be recognized at a high speed, as required.

A second object of the present invention is to provide a character recognition method and system which are capable of realizing the automatic discrimination of the brightness of a character from that of its background, the determination of the optimum threshold value for binary digitization of multi-valued two-dimensional image data, the optimal character extraction in a character height direction for an inclined row of characters, and/or the optimal character extraction in a character row direction for a broken character or a swelled character.

The above first object of the present invention can be achieved in such a manner that each time the comparison of a feature vector extracted from a character to be recognized with respective dictionary vectors of candidate characters preliminarily prepared is made for one of plural kinds of feature vectors, a candidate character having its dictionary vector away from the extracted feature vector by a distance not smaller than a predetermined value is excluded from a group of candidate characters. High-speed recognition of the row of characters can be realized by making preferential recognition/collation for a specified portion of the character row, terminating recognition at a stage when the candidate characters have been considerably restricted by exclusion, or preliminarily limiting the group of candidate characters to a group of specified candidate characters. Regarding the above second object of the present invention, the automatic discrimination of the brightness of a character or a character row itself from that of the background can be made by regarding the brightness of the character or the character row as having a smaller frequency than that of the background. The optimum threshold value for binary digitization of multi-valued two-dimensional image data can be automatically determined from a brightness histogram for brightness. The character extraction in the character height direction in the case where the character row is inclined can be made on the basis of projection distributions obtained by dividing the character row into a plurality of parts at predetermined intervals in a character row direction into a plurality of parts and projecting the respective character row parts to the character row direction. The extraction of a broken character in the character row direction can be made in such a manner that a character row existing area of the character row in the character row direction is equally divided into a plurality of regions in accordance with the number of characters and a character existing segment in each divisional region having a width smaller than a predetermined value is incorporated into the neighboring character existing segment in that divisional region. The extraction of a swelled character in the character row direction can be made in such a manner that a character existing region having a width greater than a predetermined character width is equally segmented into a plurality of portions and the minimum point existing in the vicinity of each segmentation point is defined as a point for extraction.

The dictionary vector of each candidate character is preliminarily defined as an average vector for a variety of fonts for each of plural kinds of feature vectors. If a candidate character having its dictionary vector away from a feature vector extracted from a character to be recognized by a distance not smaller than a predetermined value is excluded from a group of candidate characters each time the feature vector extracted from the character to be recognized is compared with the respective dictionary vectors for the candidate characters for one of the plural kinds of feature vectors, almost all characters can be recognized irrespective of their fonts. In the case where it is not necessary to recognize all of the characters which form a character row, a specified portion of the character row may be subjected to a preferential recognition collation processing, thereby permitting rapid character recognition. Also, in the case where it is not necessary to specify a character to be recognized to only one of plural candidate characters, a recognition processing may be terminated with no erroneous recognition at a stage when the candidate characters have been restricted down to a certain extent, thereby permitting rapid character recognition. Further, in the case where it is preliminarily known that candidate characters are of a specified type or kind, for example, numerals, a group of candidate characters may be preliminarily limited to a group of numerals, thereby permitting rapid character recognition.

For recognition of a character, a window is established such that a character or a character row is included in the window, and many-valued two-dimensional image data in the window is subjected to a predetermined image processing. For that purpose, it is necessary to automatically discriminate the brightness of a background and the brightness of the character(s) from each other and thereafter to binary-digitize the multi-valued two-dimensional image data in the window by means of the optimum threshold value. Since the proportion of the area of a background to the overall area of a window is usually larger than that of the area of the character(s) to the overall area of the window, a brightness corresponding to a peak frequency in a histogram for brightness can be regarded or discriminated as being the brightness of the background and a brightness considerably different from the background brightness can be regarded as the brightness of the character(s). Even if no clear valley portion is present in the profile of the brightness histogram, a threshold value for binary digitization by which the background and the character(s) can be clearly separated from each other can be obtained as shown in an embodiment. Characters are cut out or extracted one by one or in units of one character. In this case, if a row of characters are inclined as a whole, the character row is divided into a plurality of parts at proper intervals in a direction of the character row and the optimal character extraction in the character height direction or the optimal character extraction over a predetermined character height is made for each divisional character row part on the basis of a projection distribution to the character row direction for the character row part. For a broken character, the extraction of the character at broken positions is prevented by incorporating a character existing region smaller than a predetermined width into another character existing region. For a swelled character, a proper extraction point is easily determined through an optimal segmentation processing for a character existing region greater than a predetermined character width.

BRIEF DESCRIPTION OF THE DRAWINGS

FIGS. 5A and 5B, FIG. 6, FIG. 7, FIG. 8, FIG. 9, and FIGS. 10A and 10B are diagrams for explaining a method of determining a threshold value for binary-digitizing an in-window multi-valued two-dimensional image;

FIG. 19 is a diagram showing examples of various kinds of feature vectors used in a character recognition processing;

FIG. 20 is a diagram for explaining a method of producing a dictionary vector from feature vectors which belong to the same kind;

FIG. 21 is a diagram for explaining how candidate characters are gradually restricted from a relation between feature vectors extracted from a character to be recognized and dictionary vectors;

FIG. 22 is a diagram showing how data concerning candidate characters are altered and deleted when a recognition processing for each feature vector is performed;

FIG. 22A is a diagram showing a specific example of the data alteration and deletion explained in conjunction with FIG. 22;

FIG. 23 is a flow chart showing the details of a candidate character restricting processing;

FIG. 25 is a table showing various examples of a recognition code designator;

FIG. 26 shows an example of recognition code designators set for a row of characters;

DESCRIPTION OF THE PREFERRED EMBODIMENTS

Embodiments of the present invention will now be explained with reference to FIGS. 1 to 28.

Figure 2:
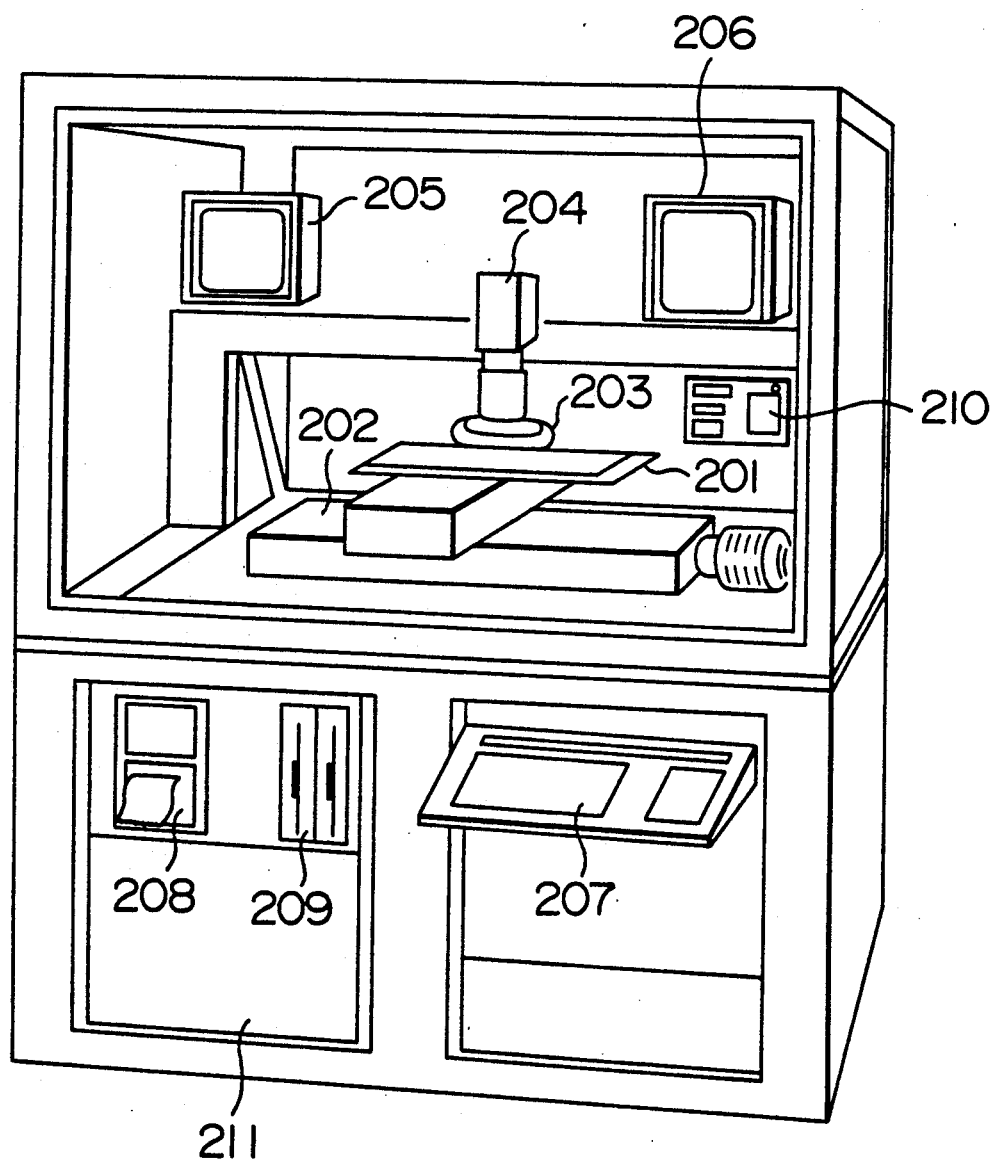
FIG. 2 is a drawing of an example of an apparatus for automatic visual inspection of a substrate having parts mounted thereon to which the present invention is applicable.

First of all, explanation will be made of an apparatus for automatic visual inspection of a substrate having parts mounted thereon to which the present invention is applicable. FIG. 2 is a drawing of an example of the apparatus. In the present apparatus, the names of parts such as IC's, LSI's or condensers mounted on a substrate 201 are read and the read names are collated with preliminarily prepared data to check whether correct parts pursuant to the design specification are mounted or not. As shown in FIG. 2, the present apparatus includes an XY table 202 for moving the substrate 201 having the parts (as objects to be recognized) mounted thereon to set one of the objects to a predetermined position, an illuminating device 203 for uniformly illuminating the object, a TV camera 204 for producing an image of the object, a recognition system 211 for processing the produced image, a monitor 205 for displaying the produced image or processed image, a CRT 206 and a keyboard 207 for displaying or inputting various data for control of the operations of respective parts or components, a printer 208 for printing out the result of inspection, a floppy disk 209 for exchange of data with an external device, and a switch panel 210 for performing controls such as start and stop operations of the apparatus itself. The apparatus may further include a Z-axis driving mechanism for obtaining an in-focus image. In order to cope with large and small character sizes, there may be provided an optical system which allows the installation of a plurality of TV cameras with different optical path lengths so as to enable imaging with a plurality of magnifications.

Figure 3:
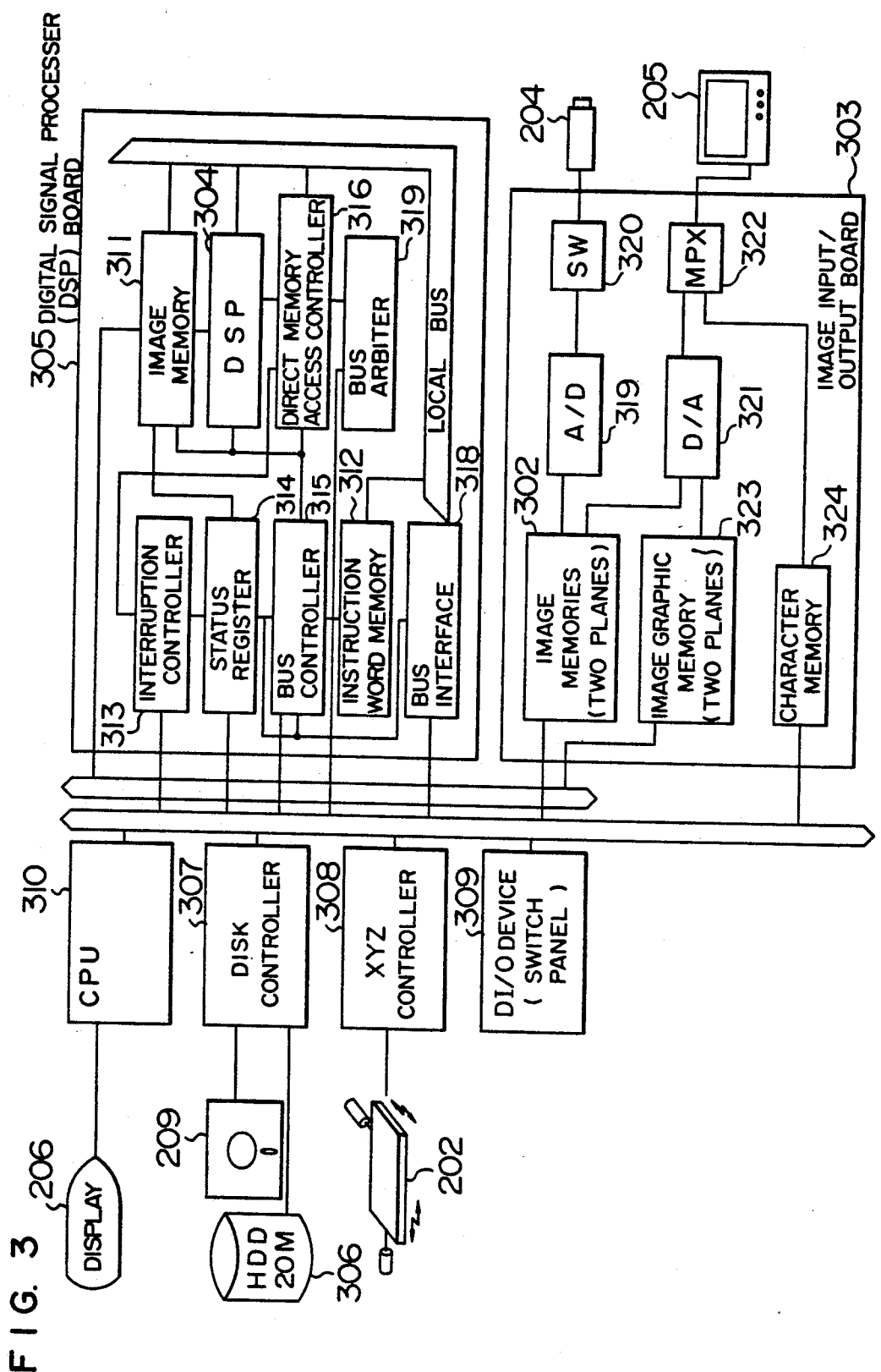
FIG. 3 is a block diagram of a recognition system, which is a main part of the automatic visual inspection apparatus shown in FIG. 2.

FIG. 3 shows the construction of the recognition system together with peripheral devices. As shown in FIG. 3, the recognition system includes an image input-/output board 303 for effecting the quantization of an input image from the TV camera, the storage of the quantized image into an image memory 302 and the outputting and displaying of various images to and on the monitor 205, a digital signal processor (DPS) board 305 having a digital signal processor (DSP) 304 for performing an operational processing at a high speed, a disk controller 307 for controlling a hard disk 306 and the floppy disk 209, an XYZ controller 308 for controlling the XY table 202 and a Z-axis thereof, a digital input/output (DI/0) device 309 for effecting an interruptive input from the switch panel 210, and a CPU 310 for controlling the blocks 303, 305, 307, 308 and 309.

Figure 1:
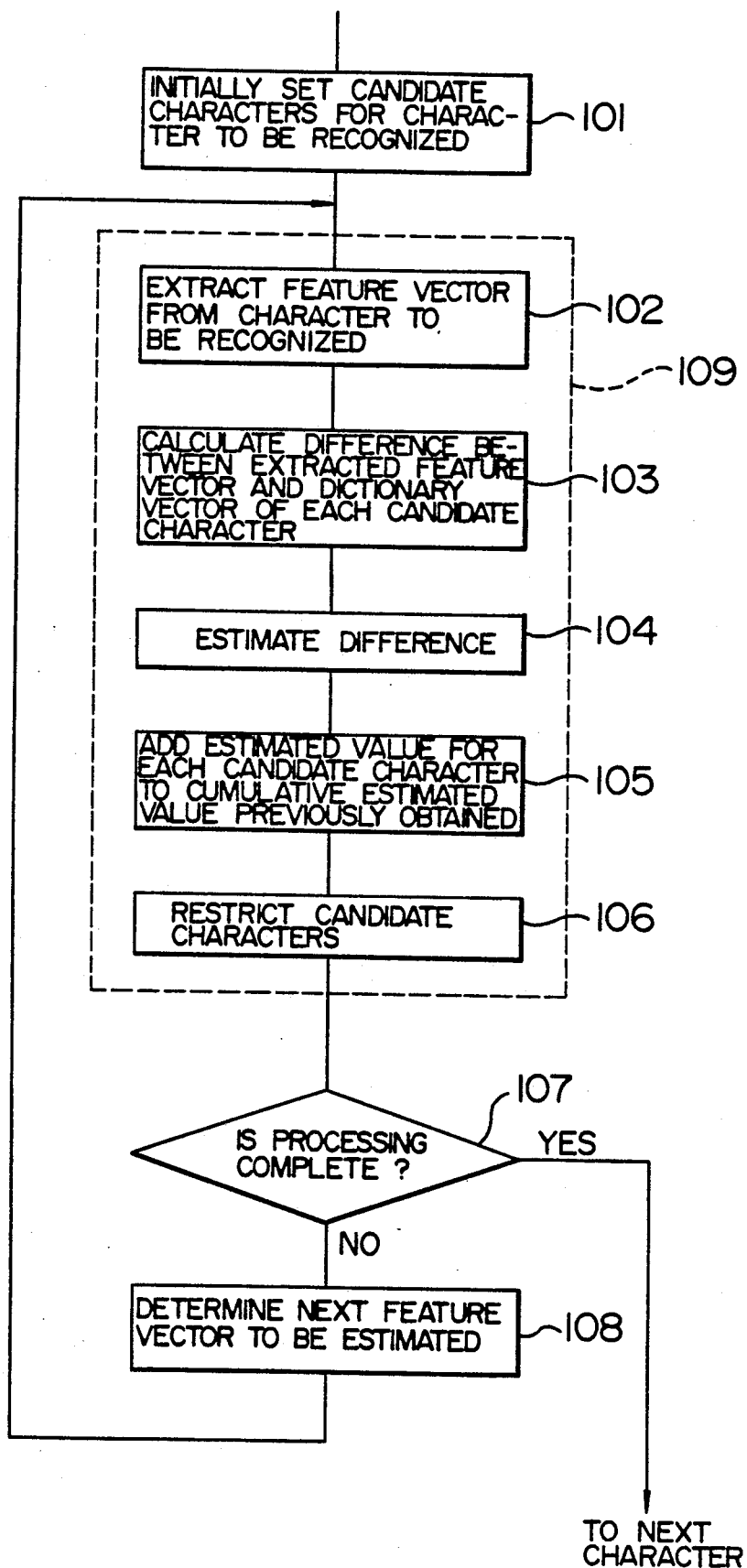
FIG. 1 is a flow chart of a character recognition processing according to the present invention.

Image data from the TV camera 204 is stored into the image memory 302 in the image input/output board 303 and/or an image memory 311 in the DSP board 305 in accordance with a command from the CPU 310 which is issued on the basis of a preliminarily described and stored program, and the image data of the image memory 302 in the image input/output board 303 is directly processed in accordance with a command from the CPU 310. The image data of the image memory 311 in the DSP board 305 is taken into the DSP 304 together with an instruction stored in an instruction word memory 312 in the DSP board 305 and is processed therein. The image data of the image memory 311 is processed in accordance with the instruction from the instruction world memory 312 but may be also processed in accordance with an instruction from the CPU 310. In FIG. 3, a reference numeral 313 designates an interruption controller, numeral 314 a status register, numeral 315 a bus controller, numeral 316 a direct memory access controller (DMAC), numeral 317 a bus arbiter, numeral 318 a bus interface, numeral 319 an A/D converter, numeral 320 a switching circuit, numeral 321 a D/A converter, numeral 322 a multiplexer, numeral 323 an image graphic memory, and numeral 324 a character memory. For the circuit of FIG. 3 the disclosure by D. Paul et al "VISTA: Visual Interpretation System for Technical Application-Architecture and Use IEEE Transactions on Pattern Analysis and Machine Intelligence", Vol. 10, No. 3 May 1988, pp 399–407, esp. FIG. 1 is available.

Figure 4:
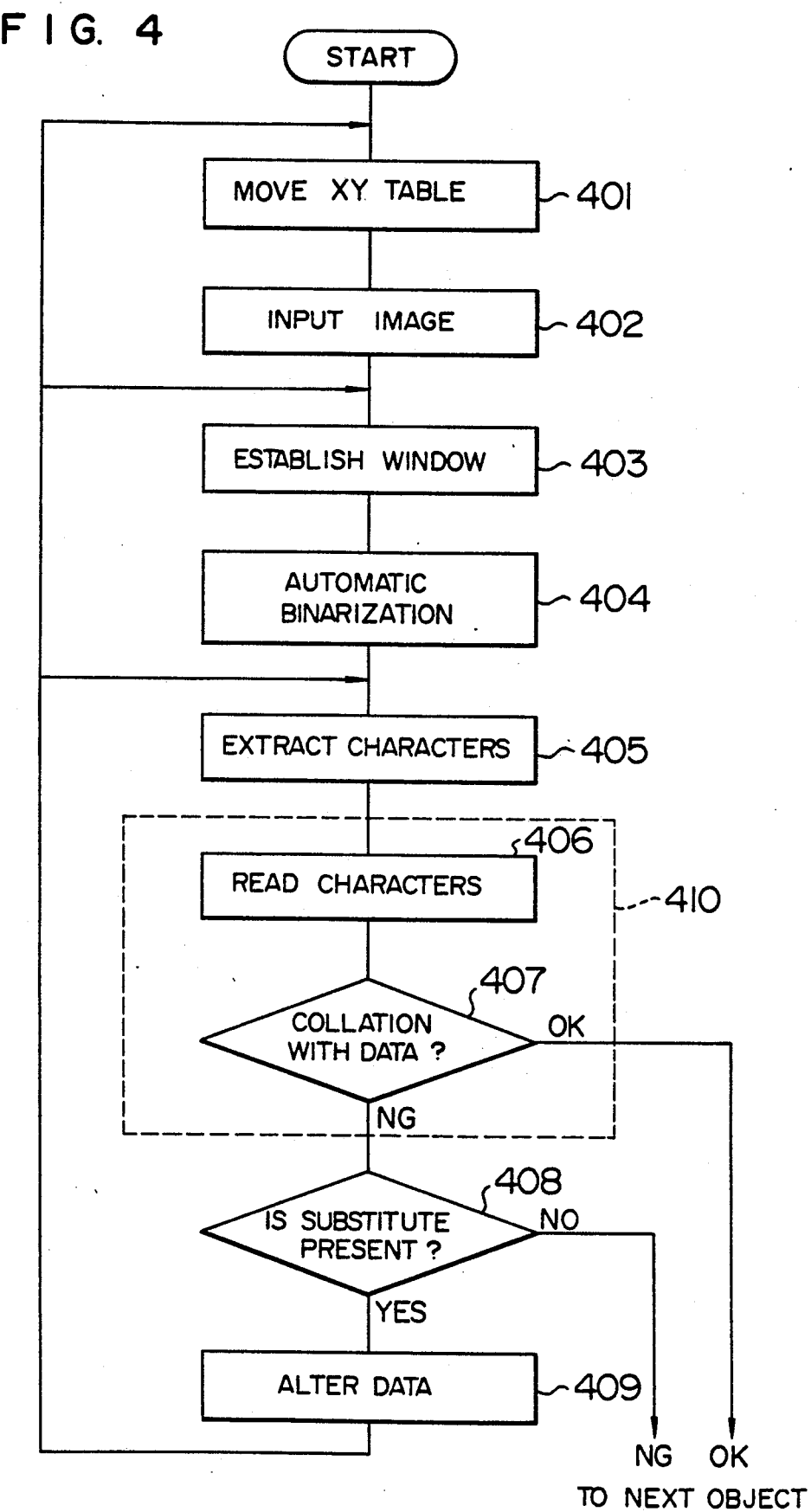
FIG. 4 is a flow chart illustrating the outline of a character recognition flow in the automatic visual inspection apparatus shown in FIG. 2.

FIG. 4 is a flow chart illustrating the outline of the overall character recognition flow in the present automatic visual inspection apparatus. In step 401, a substrate having thereon parts as objects to be recognized is moved by the XY table so that one of the objects falls within a field of view of the TV camera. Thereafter, in step 402, an image of the object is produced by the TV camera and multi-valued two-dimensional image data acquired is inputted into the recognition system. Since a location where a row of characters is indicated in a printed, stamped, carved or other form is preliminarily known, a window is established by step 403 in an area where the row of characters to be recognized is indicated. In step 404, the multi-valued two-dimensional image data in the established window is binary-digitized by use of a threshold value for binary digitization which is automatically determined from the multi-valued two-dimensional image data. Subsequently, the thus obtained binary image data is processed to recognize the characters.

The recognition of characters includes step 405 in which characters are cut out or extracted one by one or in units of one character from the binary image data and step 406 in which each of the extracted characters are recognized or read as a specified character. Generally, in the case of a character reading processing for management of products, a series of processings are finished at step 406 and the result of recognition is displayed on an external device. However, in the visual inspection of a substrate having parts mounted thereon, the result of recognition is collated with preliminarily prepared reference data in step 407 to determine whether or not the result of recognition coincides with the reference data. For this collation processing may be considered a method in which the collation is made after all of the characters forming the character row have been recognized and a method in which the collation is made each time one character is recognized. The latter method is advantageous in the case where preferential recognition/collation for a specified portion of the character row is to be made. When a read/collation step 410 including steps 406 and 407 determines the coincidence of the result of recognition with the reference data, the object is regarded as being correctly mounted on the substrate. On the other hand, when step 410 determines the anticoincidence, step 408 makes the judgement of whether of not a substitute (or a compatible part) for the object is present. This judgement in step 408 is carried out since there may be the case where an object of interest to be recognized is replaced by a substitute which has the identical function but has a different parts name indication. Accordingly, when the judgement step 408 makes the determination of the absence of any substitute, the determination of erroneous mounting is made and the flow proceeds to a character recognition processing for the next object. On the other hand, when the judgement step 408 determines the presence of a substitute, a character recognition processing for the substitute is newly performed. Prior to execution of the processing for the substitute, step 409 is carried out to alter the reference data to be collated with the result of recognition into reference data corresponding to the substitute. Step 409 may include data alteration for movement of the XY table and/or re-establishment of a window, as required. After the movement of the XY table and/or the re-establishment of a window have been made, as required, a character extraction processing is performed. This is because it is necessary to move the XY table by required amounts when a location where the name of parts is indicated falls within the field of view of the TV camera and it is necessary to re-establish the window in the case where the parts name indicating location or the number of characters included is different even when the parts name indicating location falls in the field of view of the TV camera.

Explanation will now be made of the details of steps 404, 405, 406 and 410 in the character recognition processing of which has been explained in above.

Figure 5A:
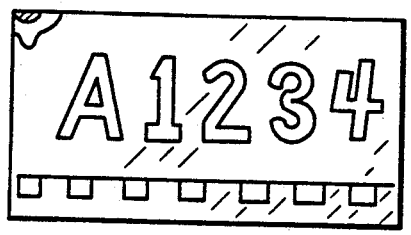
Figure 5B:
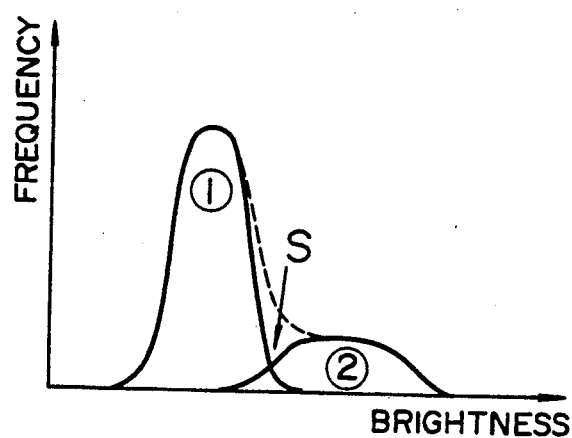
Figure 6:
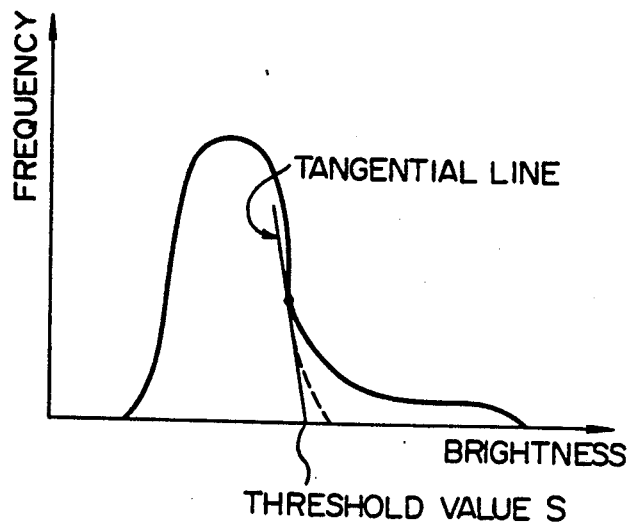

It is necessary to binary-digitize the multi-valued two-dimensional image data in order to clearly separate a background and a character(s) from each other. FIG. 5A shows an in-window multi-valued two-dimensional image of a part of an object. As shown in FIG. 5B, a brightness histogram of the multi-valued two-dimensional image includes the superposition of a distribution curve 1 for brightness of the background and a distribution curve 2 for brightness of characters and the overlapping portion takes a composite profile as shown by a dotted curve. Accordingly, by establishing or determining as a threshold value a brightness at the intersection of the distribution curves 1 and 2, it becomes possible to separately extract or discriminate the characters or the like from the background. Various methods may be employed for estimating an inflection point (inclusive of the intersection of the distribution curves 1 and 2) of the brightness histogram. For example, in a method shown in FIG. 5B, parameters for the distribution curve 1 are determined on the assumption of the distribution curve 1 being a normal distribution curve, the component of 1 is removed from the histogram on the basis of the determined parameters, the component of 2 is determined from the remaining histogram portion, and thereafter the brightness at the intersection of 1 and 2 is determined as a threshold value. Alternatively, the distribution curve 1 may be assumed to be a quadratic curve. According to a method of determining a threshold value more simply, a tangential line is drawn from a proper point on the histogram curve to use the intersection of the tangential line and the brightness axis as a threshold value S, as shown in FIG. 6. In another method shown in FIG. 7, a peak point A of the histogram and the farmost extreme B of the histogram are connected by a straight line and a point on the histogram farthest from the straight line is determined as an inflection point. The method shown in FIG. 7 is also applicable to the case where two peaks are involved as shown in FIG. 8.

In a further method shown in FIG. 9, the brightness frequency around a peak point A on the histogram is sampled at some points to make an approximation to a quadratic curve or a normal distribution curve and the intersection of the quadratic curve or the normal distribution curve and the brightness axis is determined as a threshold value S. In a further method shown in FIGS. 10A and 10B, a cumulative frequency curve (ogive) as shown in FIG. 10B is determined as $$H_i = \sum_{i=0}^{i} h_i$$

($i=0$ to the maximum value of brightness) from a brightness versus frequency curve shown in FIG. 10A, and the intersection of two straight lines $l_1$ and $l_2$ obtained by the approximation from the cumulative frequency curve is determined as a threshold value S or a point on the cumulative frequency curve at the farthest distance D from a straight line L connecting two proper points (for example, a point of 10% and a point of 90%) on the cumulative frequency curve is determined as a threshold value S.

Figure 7:
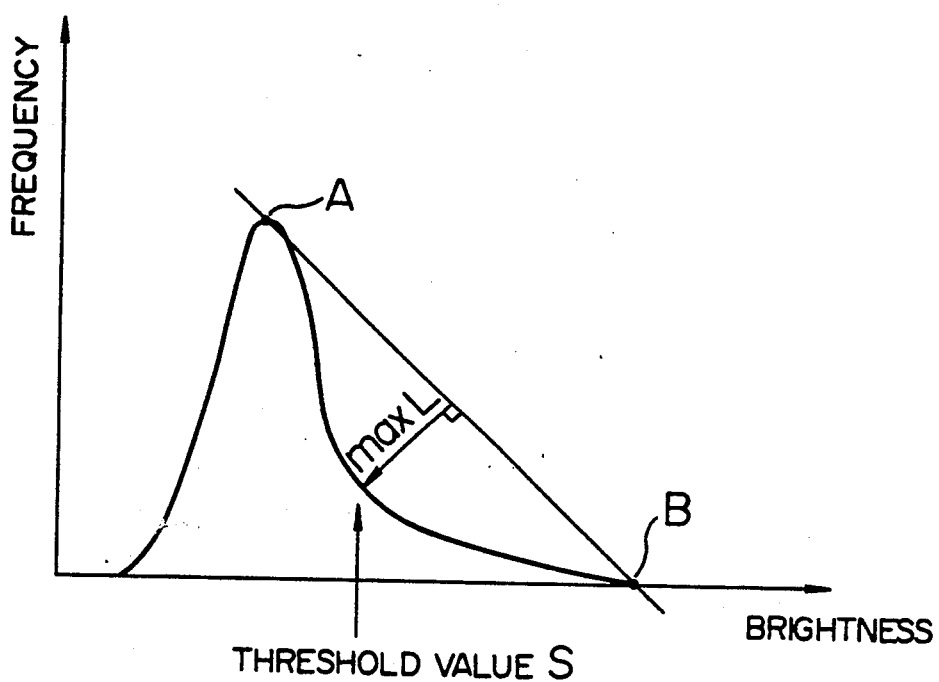
Figure 8:
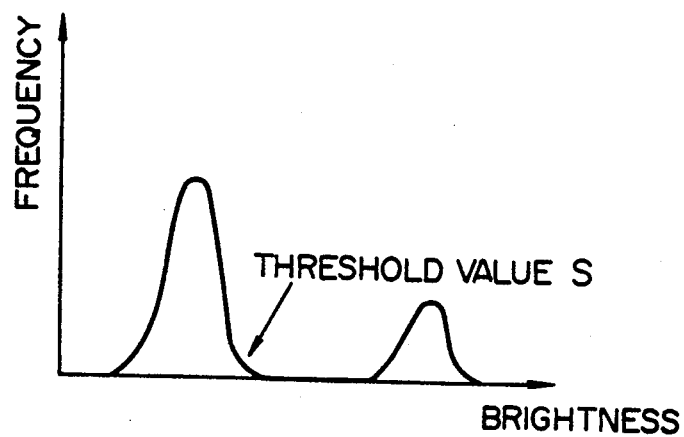
Figure 11:
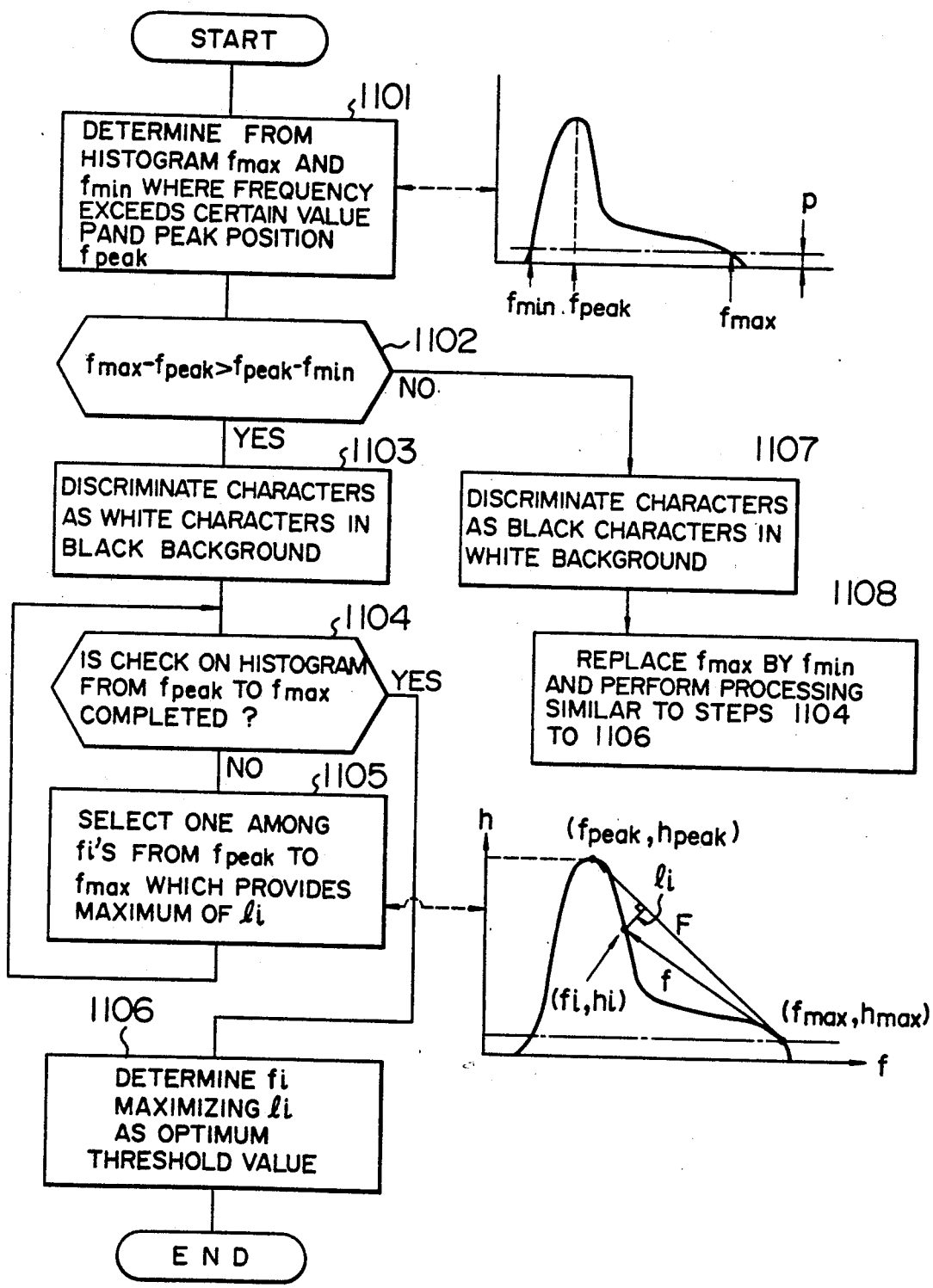
FIG. 11 is a flow chart of a processing for determination of the optimum threshold value.

Now, an operation performed in a processing for determination of the threshold value will be specifically explained taking the method shown in FIG. 7 by way of example and referring to FIG. 11 which shows the flow of a processing for determination of the optimum threshold value. In FIG. 11, step 1101 determines from the brightness histogram the minimum $f_{min}$ and the maximum $f_{max}$ of brightness values at which the frequency exceeds a certain value P and a peak position $f_{peak}$ which the histogram takes. Next, in step 1102, a distance from $f_{peak}$ to $f_{max}$ and a distance from $f_{peak}$ to $f_{min}$ are compared with each other. In general, the brightness of characters is reflected on a longer-distance side. Therefore, the characters can be automatically discriminated as substantially white characters if $f_{max}-f_{peak}$ is greater than $f_{peak}-f_{min}$ and as substantially black characters if $f_{peak}-f_{min}$ is greater than $f_{max}-f_{peak}$. The results of judgement by step 1102 are stored in step 1103 or 1107. In the case of white characters, a distance $l_i$ from each point ($f_i$, $h_i$) on the histogram to a straight line F connecting a point ($f_{peak}$, $h_{peak}$) and a point ($f_{max}$, $h_{max}$) is checked or examined in steps 1104 and 1105. In step 1105, a point ($f_i$, $h_i$) providing the maximum value of $l_i$ is selected each time $l_1$ corresponding to point ($f_i$, $h_i$) is determined. Accordingly, a point ($f_i$, $h_i$) being selected at the point of time when the completion of check on the histogram from $f_{peak}$ to $f_{max}$ is judged in step 1104, is determined as an inflection point and $f_i$ at that point is determined as the optimum threshold value. The distance $l_1$ may be determined by the following equation:

$$l_i = |F \times f| / |F|$$

where F is the vector of a line segment F from the point ($f_{max}$, $h_{max}$) to the point ($f_{peak}$, $h_{peak}$) and f is the vector of a line segment f from the point ($f_{max}$, $h_{max}$) to the point ($f_i$, $h_i$).

In the case of black characters, on the other hand, $f_{max}$ and $h_{max}$ are respectively replaced by $f_{min}$ and $h_{min}$ is step 1108 to perform a processing similar to that in the case of white characters.

In this manner, the optimum threshold value capable of clearly and stably discriminating characters can be determined through relatively simple calculation.

Figure 12A:
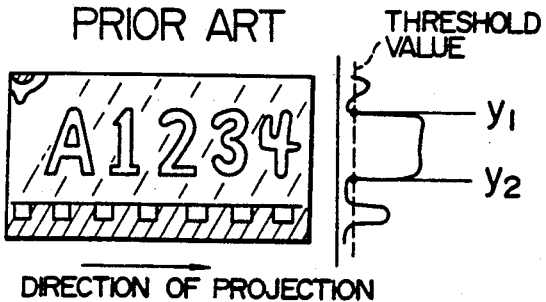
FIGS. 12A and 12B are views for explaining the conventional method for extraction of characters in a character height direction.
Figure 12B:
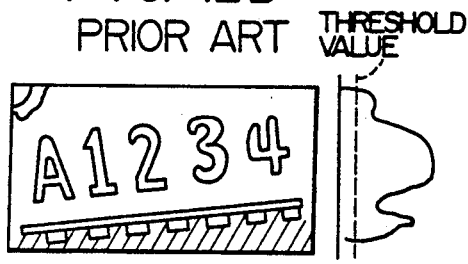

Next, explanation will be made of a processing for extraction of characters. The extraction of characters is made first in a direction of character height and thereafter in a direction of character width. In the conventional method for extraction of characters, as shown in FIG. 12A, in-window binary two-dimensional image data is projected to the character width direction to produce a projection distribution; and when the projection distribution has two minimum points smaller than a certain threshold value, a character height region (a region between $y_1$ and $y_2$ in FIG. 12A) sandwiched between the two minimum points and having values greater than the threshold value is cut out or extracted as a region of interest. However, in the case where the row of characters is inclined with respect to the field of view, as shown in FIG. 12B, it becomes difficult to establish a proper threshold value on the projection distribution and hence it is not possible to successfully extract a character height region. Such an inconvenience can be eliminated in the present invention in which in-window binary two-dimensional image data is properly divided into n parts in the character width direction and a character height region for each divisional part is determined from a projection distribution to the character width direction for each divisional part determined on the assumption that any character inclination in each divisional part can be ignored.

Figure 13:
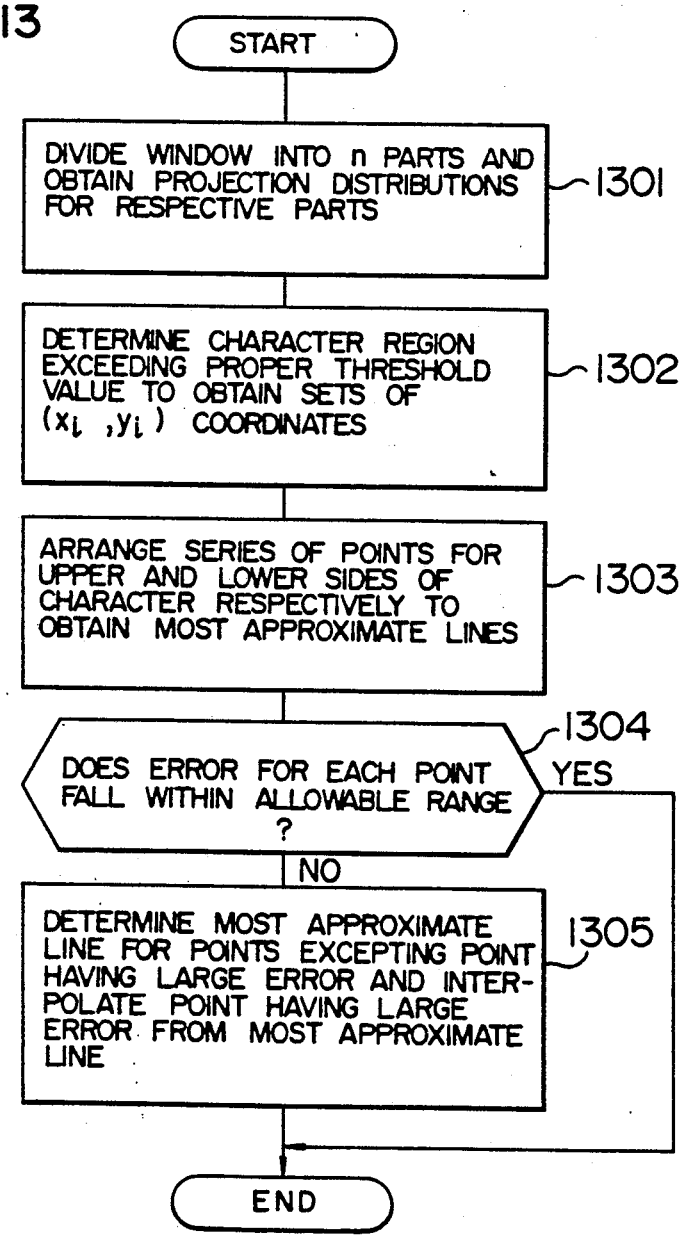
FIG. 13 and FIGS. 14A and 14B are a flow chart and views for explaining a method for extraction of characters in a character height direction according to the present invention.
Figure 14A:
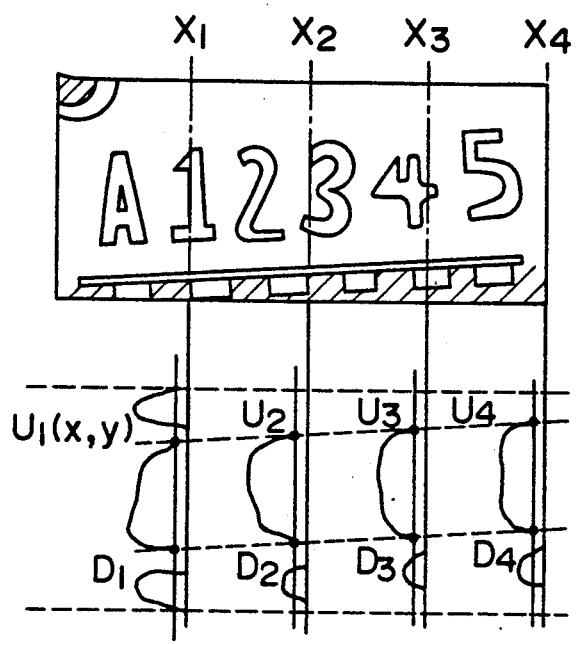
Figure 14B:
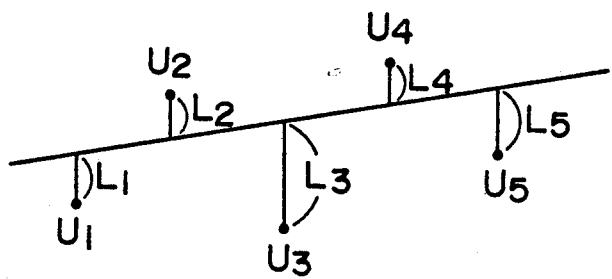
Figure 15A:
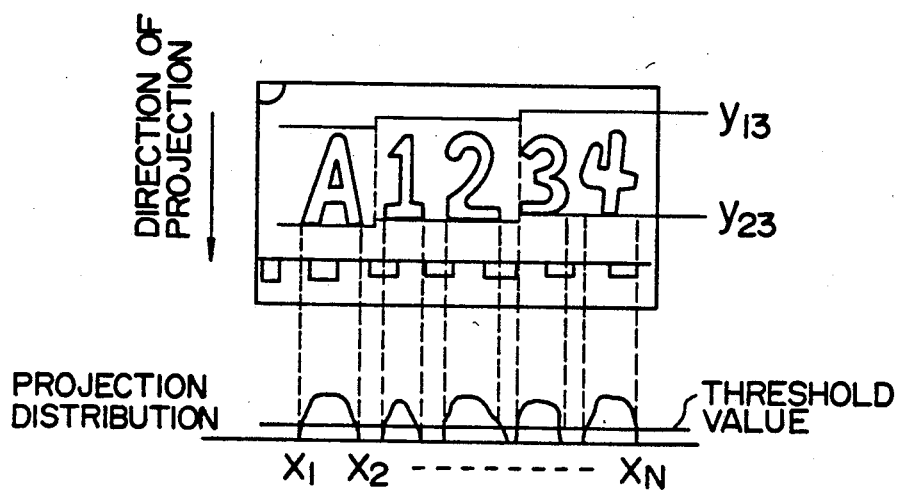
FIGS. 15A, 15B and 15C are views for explaining the extraction of characters in a character width direction and inconveniences which are encountered by this character extraction in the case where broken characters and a swelled character are present.

FIG. 13 is a flow chart of a processing for extraction of characters in the character height direction according to the present invention. Explaining the flow chart of FIG. 13 with reference to FIGS. 14A and 14B, step 1301 divides in-window binary two-dimensional image data into n parts or sections (n=4 in the shown example) in the character width direction and produces a projection distribution to the character width direction for each divisional part or section, as shown in FIG. 14A. In this case, it is not required that the division into the n sections should be made with equal widths or at equal intervals. Generally, the width of division is equal to or greater than one time of the character width. Next, in step 1302, a character region exceeding a proper threshold value is determined as sets of upper coordinates $U_i(x, y)$ (i=1 to n) and lower coordinates $D_i(x, y)$ (i=1 to n) from the projection distributions corresponding to the respective divisional sections. In step 1303, the most approximate straight lines are respectively determined for the upper coordinates $U_i$ and the lower coordinates $D_i$, for example, as shown in FIG. 14B. In step 1304, whether or not an error of each point falls within an allowable range is judged. For example, regarding $U_i$, whether or not an error $L_i$ from each $U_i$ to the most approximate line falls within an allowable range is judged. The same holds for $D_i$. If a point having a large error is present, the flow proceeds to step 1305 in which the most approximate line is determined again for points excepting that point and the excluded point is interpolated from the determined most approximate line so that extraction positions in each divisional section in the character height direction are obtained as $y_{1i}$ and $y_{2i}$, as shown in FIG. 15A.

Figure 15B:
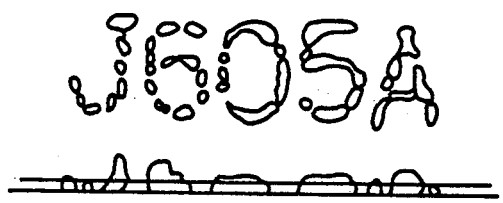
Figure 15C:
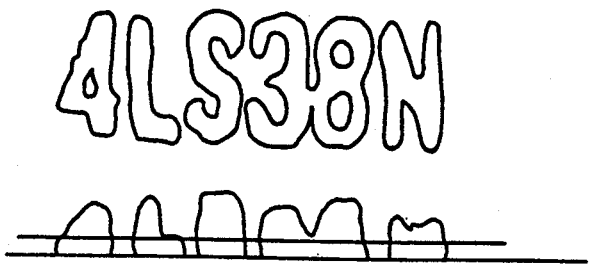
Figure 16:
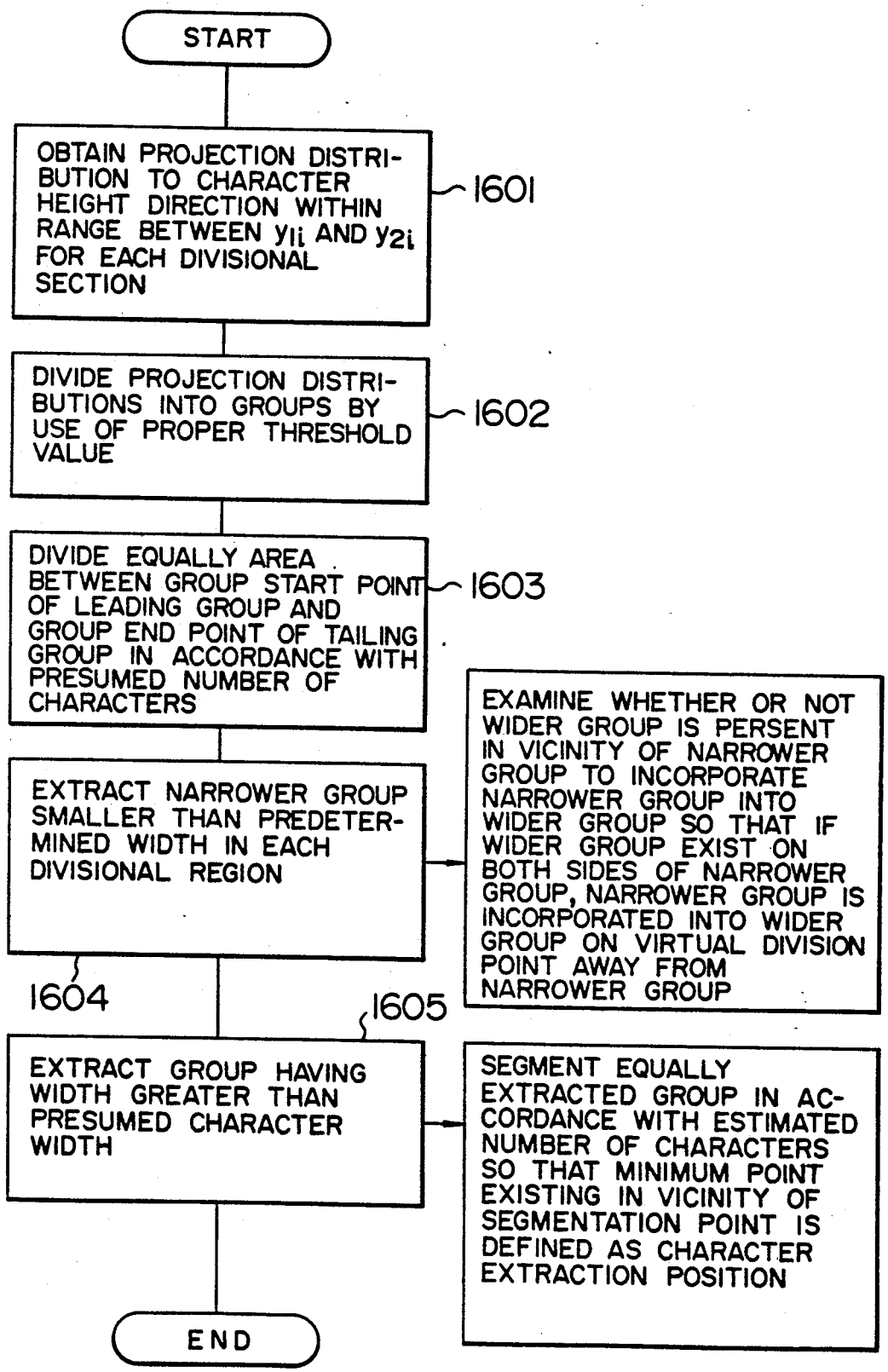
FIG. 16 and FIGS. 17A, 17B and 17C are a flow chart and diagrams for explaining the extraction of a broken character and a swelled character in a character width direction according to the present invention.

Next, a processing for extraction in the character width direction will be explained with reference to FIG. 16. In step 1601, for each divisional section, a projection distribution to the character height direction is produced within the extraction range between $y_{1i}$ and $y_{2i}$ in the character height direction, as shown in FIG. 15A. Next, in step 1602, each of the projection distributions is compared with a proper threshold value to determine character extraction positions $X_1$, $X_2$, - - -, $X_N$ as points of division to groups. However, in the case a character is broken into plural parts or swelled to be contiguous to an adjacent character, as shown in FIG. 15B or 15C, there may be encountered an inconvenience that an undesired extraction position is created even within the width of one character or any extraction position cannot be detected between characters. In the present invention, a processing for incorporation and/or a processing for segmentation for extracted groups are performed in order to avoid such an inconvenience. Thereby, correct character extraction positions can be obtained.

Figure 17A:
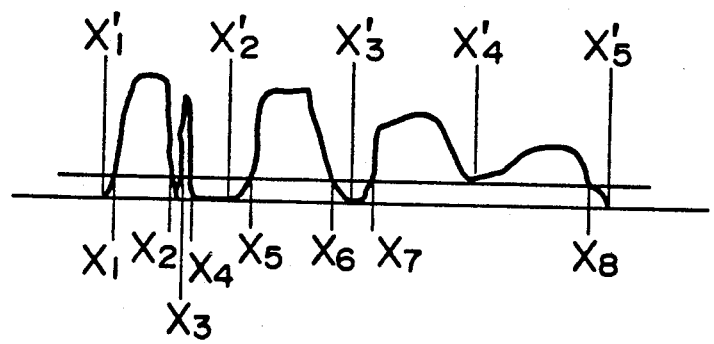
Figure 17B:
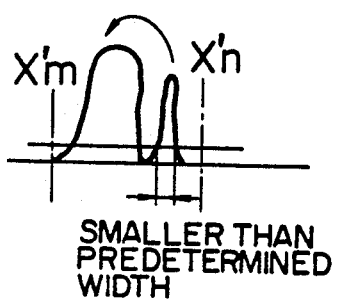
Figure 17C:
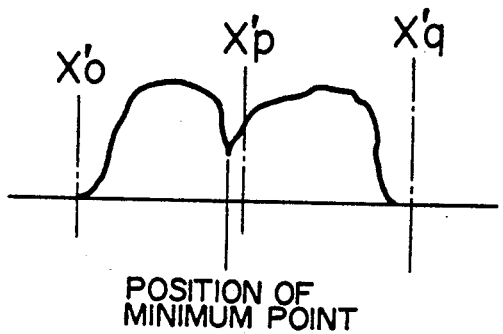

More particularly, as shown in FIG. 17A, an area between a group start point $X_s$ (corresponding to $X'_1$) of the leading group of groups into which the projection distributions are divided by division points $X_1$ to $X_8$ by step 1602 and a group end point $X_e$ (corresponding to $X'_5$) of the tailing group thereof is virtually and equally divided into a plural regions in accordance with the presumed number of characters in step 1603. In the shown example, the presumed number of characters is 4 and $X'_1$ to $X'_5$ are virtual division points. Next, in step 1604, a narrower group having a width smaller than a predetermined width, if any, is extracted in each divisional region and it is incorporated or integrated into a wider group existing in the vicinity of the narrower group and having a width not smaller than the predetermined width, as shown in FIG. 17B. If wider groups exist on both sides of the narrower group, the narrower group is incorporated into one of the wider groups existing on the side of that one of two virtual division points on opposite sides of the narrower group which is far away from the narrower group. Aside from the existing group having a width greater than a presumed character width, there may be a possibility that a group having a width greater than the presumed character width is newly produced by the above-mentioned incorporation processing. In step 1605, such a wider group as well as the existing wider group are extracted. For the extracted group, the number of characters included therein is estimated, the group is equally segmented in accordance with the estimated number of characters, and the minimum point existing in the vicinity of each segmentation point is defined as a new character extraction position. For example, for a group having a width corresponding to two characters, as shown in FIG. 17C, the group is equally segmented into two at a point $X'_p$, a search is made for the minimum point in a predetermined range around the segmentation point $X'_p$, and the located minimum point is selected as the boundary between characters.

Next, explanation will be made of a process for reading of characters. The recognition of a character is made irrespective of the kind of a specific font of that character but by using various feature quantities for that character to gradually restrict candidates for that character. The feature quantities are represented by N-dimensional vectors and plural kinds of N-dimensional feature vectors are prepared as dictionary vectors in correspondence to each candidate character. More particularly, the plural kinds of feature vectors prepared corresponding to each of the candidate characters and feature vectors extracted from a character to be recognized are successively compared for every corresponding feature vector to estimate a difference therebetween each time the comparison is made. In case the cumulative estimated value of difference for a certain candidate character becomes greater in the course of comparison, that candidate character is excluded from the group of candidate characters. Thereby, even if the character to be recognized cannot be recognized by use of only one kind of feature vector, it becomes possible to ultimately recognize the character to be recognized as a specified character by virtue of a plurality of feature vectors.

FIG. 1 shows a flow chart of a character recognition processing for one character. Referring to FIG. 1, characters being candidates for a character to be recognized are initially set as character codes in step 101. In step 102, a certain feature vector is extracted from the character to be recognized. In step 103, a difference between the extracted feature vector and the corresponding one of feature vectors as dictionary vectors preliminarily prepared for each candidate character is determined. In step 104, the determined difference is estimated referring to a dictionary deviation vector preliminarily prepared. In step 105, the estimated value obtained for each candidate character is added to the cumulative estimated value previously obtained for that candidate character. In step 106, a candidate character having the cumulative estimated value greater than a predetermined value is excluded from the candidate character group on the basis of the resultant cumulative estimated value obtained in step 105, thereby making selective restriction of candidate characters.

If the above-mentioned recognition processing 109 for one feature vector including steps 102 to 106 is repeated with alteration of the kind of the feature vector into the next one to be estimated in step 108 until step 108 determines that the remaining candidate character(s) satisfies a predetermined condition(s), the character to be recognized can be specified or substantially specified. In the selection or alteration of the feature vector in step 108, the next feature vector may be determined in accordance with the remaining candidate characters. In the case where the satisfaction of the redetermined condition is determined in step 107 a recognition processing for the next character to be recognized is started.

Now, explanation will be made of the details of feature vectors extracted from a character to be recognized, dictionary vectors for each candidate character, and the restriction of candidate characters.

In extracting feature vectors from a character to be recognized, a character region detected or defined by the character extraction processing is converted or divided into (N×M) constant sizes or proportions irrespective of the size of that character and feature vectors are extracted as $V=(w_1, w_2, w_3, ---, w_{15})$. In order to cope with a variety of character fonts, a broken character and/or a swelled character, these feature vectors are attribulal (or ascribed) to the structure of the character and are not unique or uniformized features. In the case of the uniformized feature such as the number of holes, only the judgement of "0" and "1" is possible and very unstable recognition is therefore made for a broken character and/or a swelled character, which is liable to give rise to erroneous recognition. FIG. 19 shows examples of various kinds of feature vectors used in a character recognition processing. Typical feature vectors are of twelve kinds of vectors which include a 3×5 division vector, a 2×4 division vector, an aspect (longitudinal/lateral) ratio vector, a longitudinal structure vector, a lateral structure vector, a right/left area difference vector, a longitudinal intersection number vector, a maximum lateral structure vector, a left recessed area vector, a right recessed area vector, a left and upper corner area vector, and a longitudinal structure vector difference vector. These feature vectors represent features peculiar or attributable to a character and may be generally classified into a group of features which can be stably extracted from any character and a group of features which are effective only in the discrimination of a specific character. In this connection, the above feature vectors are briefly explained as follows.

Figure 18:
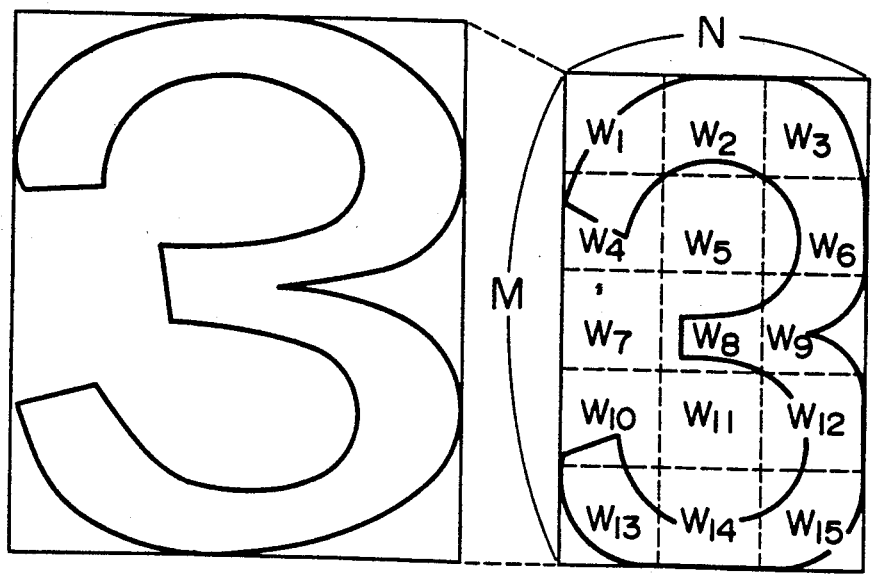
FIG. 18 is a diagram for explaining a general method for extraction of a feature vector from a character to be recognized.

3×5 DIVISION: This is a fifteen-dimensional vector obtained by dividing a circumscribed quadrilateral of a character into 3×5 meshes and taking the areas of character portions in the respective meshes as vector elements. FIG. 18 shows an example of this feature vector.

2×4 DIVISION: This is an eight-dimensional vector obtained by dividing an inner portion of a region defined by a circumscribed quadrilateral of a character into 2×4 meshes so as to spread across 3×5 division meshes obtained when the circumscribed quadrilateral is divided into 3×5 meshes and taking the areas of character portions in the respective 2×4 meshes as vector elements.

ASPECT RATIO: This represents the aspect (longitudinal/lateral) ratio of a circumscribed quadrilateral of a character immediately after the extraction thereof and is a one-dimensional vector used for separating the character "1" from another.

LONGITUDINAL STRUCTURE VECTOR: This is a six-dimensional vector obtained by dividing a character into three longitudinal segments in a lateral direction and taking as a vector element the sum of distances from upper and lower frames of a character region to the character in each divisional longitudinal segments.

LATERAL STRUCTURE VECTOR: This is a ten-dimensional vector obtained by dividing a character into five lateral segments in a longitudinal direction and taking as a vector element the average of distances from right and left frames of a character region to the character in each divisional lateral segment.

RIGHT/LEFT AREA DIFFERENCE: This is a five-dimensional vector obtained by dividing a character into five lateral segments in a longitudinal direction and taking as a vector element a difference between the area of a right-hand character portion and the area of a left-hand character portion in each divisional segment.

LONGITUDINAL INTERSECTION NUMBER: This is a three-dimensional vector determined by counting the number of cross points at which a central portion of a character region intersects each of longitudinal scanning lines. The first vector element of the three-dimensional vector is the number of scanning lines at which the number of cross points is 1. The second vector element is a scanning line number at which the cross point number is 2. The third vector element is a scanning line number at which the number of cross points is 3.

MAXIMUM LATERAL STRUCTURE VECTOR: This is a four-dimensional vector taking as a vector element the maximum of distances from a character frame to a character in each of a left and upper portion, a right and upper portion, a left and lower portion and a right and lower portion of a character region, where the vector elements for the right and upper portion and the right and lower portion are substantially zero and so, not shown in FIG. 19.

LEFT RECESSED AREA: This is used for examining the unevenness of the left-hand face of a character and is a one-dimensional vector taking as a vector element the area of a portion recessed from a reference line connecting a position in a left and upper part at which a distance from a character frame to the character is minimum and a position in a left and lower part at which a distance from the character frame to the character is minimum.

RIGHT RECESSED AREA: This is used for examining the unevenness of the right-hand face of a character and is a one-dimensional vector taking as a vector element the area of a portion recessed from a reference line. The reference line is determined by connecting positions on the character at which the distance between the character and the character frame for a vector element in each of upper character frame and right and lower character frame is minimum.

LEFT AND UPPER CORNER AREA: This is a one-dimensional vector in which the area of a space between a character frame and a character at a left and upper corner portion of a character region is taken as a vector element.

LONGITUDINAL STRUCTURE VECTOR DIFFERENCE: This corresponds to a difference between upper and lower components of the longitudinal structure vector and is a one-dimensional vector in which a difference between distances from upper and lower character frames to a character is taken as a vector element. Vector elements in the central portion are not shown as they are substantially zero. These feature vectors are produced by the combination of fundamental data obtained detecting a character area in each of 6×10 meshes by the division from a character frame, distances from upper, lower, right and left character frames to a character, and the number of lateral intersections with the character when a character region is uniformalized into a constant value. This processing is performed by the DSP 304, thereby producing feature vectors at a high speed. The vectors may be normalized in order to make the magnitudes of the vectors uniform, as required.

Next, explanation will be made of dictionary vectors. The dictionary vector is produced as an average vector for a variety of fonts collected in concordance with each character from various maker's objects (such as IC substrates) to be recognized and for each feature vector. The patterns of a variety of fonts are preliminarily registered as character patterns for dictionary production in the hard disk 306. Generally, in the case where it is desired to obtain an N-dimensional feature vector as a dictionary vector from n kinds of font patterns for a certain character, feature vectors $V_1$ to $V_n$ as shown in FIG. 20 are determined from those font patterns as follows:

$$V_1 = (v_{11}, v_{12}, v_{13}, \ldots, v_{1N}) \\ V_2 = (v_{21}, v_{22}, v_{23}, \ldots, v_{2N}) \\ \vdots \\ V_n = (v_{n1}, v_{n2}, v_{n3}, \ldots, v_{nN}) \tag{1}$$

where $V_{nN}$ is an n-dimensional element for an n-th character.

Accordingly, an N-dimensional feature vector (V) 2001 is determined taking as an element the average of elements in the feature vectors $V_1$ to $V_n$. Feature vectors as the remaining dictionary vectors for that character are also determined similarly. More particularly, from n kinds of font patterns for a character in k kinds of characters such as A, B, C,- - - are determined N-dimensional feature vectors $V_{k1}$ to $V_{kn}$ corresponding to the font patterns as follows:

(k kinds of each character are $$V_{k1} = (v_{k11}, v_{k12}, v_{k13}, \ldots, v_{k1N}) \\ V_{k2} = (v_{k21}, v_{k22}, v_{k23}, \ldots, v_{k2N}) \\ \vdots \\ V_{kn} = (v_{kn1}, v_{kn2}, v_{kn3}, \ldots, v_{knN}) \tag{2}$$

Accordingly, an N-dimensional feature vector $V_k$ as a dictionary vector is determined by the following equation:

$$V_k = \left( \frac{\sum_{i=1}^{n} v_{ki1}}{n}, \frac{\sum_{i=1}^{n} v_{ki2}}{n}, \ldots, \frac{\sum_{i=1}^{n} v_{kiN}}{2} \right) \tag{3}$$

$$= (u_{k1}, u_{k2}, \ldots, u_{kN})$$

where $u_{kN} = \frac{1}{n} \sum_{i=1}^{n} v_{kiN}$.

Also, the average l of lengths $l_i$ of the N-dimensional feature vectors $V_{k1}$ to $V_{kn}$ is determined as follows:

$$l = \frac{\sum_{i=1}^{n} l_i}{n} = \frac{\sum_{i=1}^{n} \sqrt{\sum_{j=1}^{N} (v_{kij})^2}}{n} \tag{4}$$

The length l is established as the (N+1)th element of $V_k$. In this connection, in the case where the feature vector $V_k$ is to be normalized, the length of a vector before normalization is used for $l_i$.

In determining $V_k$, a standard deviation is also determined as a deviation or fluctuation (corresponding to symbol 2002 in FIG. 20) and it is stored as a dictionary deviation vector D together with $V_k$. The dictionary deviation vector D is composed of the following elements:

$$D = \left( \frac{\sqrt{\sum_{i=1}^{n} (v_{ki1} - u_{k1})^2}}{n}, \frac{\sqrt{\sum_{i=1}^{n} (v_{ki2} - u_{k2})^2}}{n}, \ldots, \right. \\ \left. \frac{\sqrt{\sum_{i=1}^{n} (v_{kiN} - u_{kN})^2}}{n}, \frac{\sqrt{\sum_{i=1}^{n} (l_i - l)^2}}{n} \right) \tag{5}$$

Further, explanation will be made of the restriction of candidate characters. By repeating the character recognition processing step 109 for one feature vector on the basis of dictionary vectors (plural kinds of feature vectors) for each character which have been produced in the above-mentioned manner, candidate characters are restricted. FIG. 21 illustrates how candidate characters are gradually restricted by performing successive recognition processings for feature vectors $\alpha$, $\beta$ and $\gamma$. In the known example, characters (or categories) i, j, k, m and l remain as candidate characters. A feature vector (represented by thick solid arrow) for a certain kind of feature vector o extracted from a character to be recognized is compared or collated with each of dictionary vectors (represented by thin solid arrows) of candidate characters and at least the characters i and l corresponding to the dictionary vectors which do not embrace within their deviation ranges the extracted feature vector are excluded from the group of candidate characters. A similar collation and exclusion is made for each of feature vectors $\beta$ and $\gamma$. As a result of the successive recognition processings, the character to be recognized is ultimately recognized as being k, as shown in FIG. 21.

FIG. 22 illustrates how data concerning a candidate character group is altered and deleted when recognition processings for feature vectors 1, 2, 3, - - -, i are successively performed. As types of data concerning a candidate character group are prepared the number 2201 of candidate characters, the most resemble character 2202 (for a character to be recognized), an estimated distance 2203 of the most resembled character (or an estimated distance of the most resemble character 2202 in regard to the character to be recognized), candidate characters 2204, and estimated distances 2205 of the respective candidate characters 2204 (or estimated distances of the candidate characters in regard to the character to be recognized).

The recognition processing will be explained more particularly in reference to FIG. 1. In step 101, the number 2201 of candidate characters and the candidate characters 2204 are initially set. In the case where the kinds of candidate characters are preliminarily known, the number 2201 of candidate characters can be initially set to a smaller value. For example, in the case where it is preliminarily known that characters to be recognized include only Arabic figures (or numerals), the number 2201 of candidate characters is set to 10 and candidate characters 2204 are set to character codes corresponding to numerals "0", "1", "2", - - -, "9". After the initialization, a feature vector for a certain kind of feature vector 1 is extracted from a character to be recognized in step 102 and a distance between the extracted feature vector and each of dictionary vectors corresponding to numerals "0" to "9" is determined in step 103. Next, in step 104, the distance between the extracted feature vector and each dictionary vector is divided by the corresponding one of dictionary deviation vectors D corresponding to numerals "0" to "9" and the result of division is defined as an estimated distance. In this connection, two distance estimating methods are present and either one thereof may be employed in accordance with the kind of a feature vector. In one of the two methods, the division of the distance by the dictionary deviation vector D is made for each of vector components and the sum of absolute values of the results of division for the respective vector components is defined as an estimated distance value. In the other method, estimation is made by use of only distances between vectors. For example, the vector S of a difference between an extracted feature vector $X=(x_1, x_2, ---, x_N, l)$ and a dictionary vector $V=(v_1, v_2, ---, v_N, L)$ corresponding to a certain character is defined as $S=(x_1-v_1, x_2-v_1, ---, x_N-v_N, 1-L)$. Provided that a dictionary deviation vector D is $D=(d_1, d_2, ---, d_N, M)$, an estimated value is defined by $$\sum_{i=1}^{n} (|x_i - v_i|/d_i)/N$$

or $(l-L)/M$.

In this manner, the estimated distance value for the feature vector 1 is determined corresponding to each of the candidate characters. In step 105, the estimated distance value is added to the cumulative estimated distance value previously obtained corresponding to each candidate character. Thereby, the estimated distance 2205 of each candidate character is altered or updated. As shown in FIG. 23, in step 2301, the estimated distances 2205 of candidate characters after alternation thereof are searched for the minimum value thereof and a candidate character corresponding the minimum value is determined so that an estimated distance 2203 of the most resemble character and the most resembled character 2202 are altered or set to the located minimum value and the determined candidate character, respectively. Thereafter, in step 2302, the number 2201 of candidate characters is altered so that only candidate characters having their estimated distances which differ from the estimated distance 2203 of the most resemble character after alternation within a predetermined range are left, and unnecessary candidate characters and estimated distances therefor are deleted from the candidate characters 2204 and the estimated distances 2205 of candidate characters. By repeating the above processing each time the kind of the feature vector is altered, the number 2201 of candidate characters is gradually reduced so that the candidate characters are restricted. FIG. 22A illustrates a process along which one character to be recognized is subjected to the above-mentioned comparison and estimation processing to recognize a numeral "3". For each of candidate characters "1", "2", - - -, "9" and "0", an estimated value of that candidate character in regard to the character to be recognized is cumulatively calculated as the comparison of the candidate character with the character to be recognized is made successively for feature vectors, and a candidate character having its cumulative estimated value exceeding a predetermined threshold value is excluded.

Figure 24:
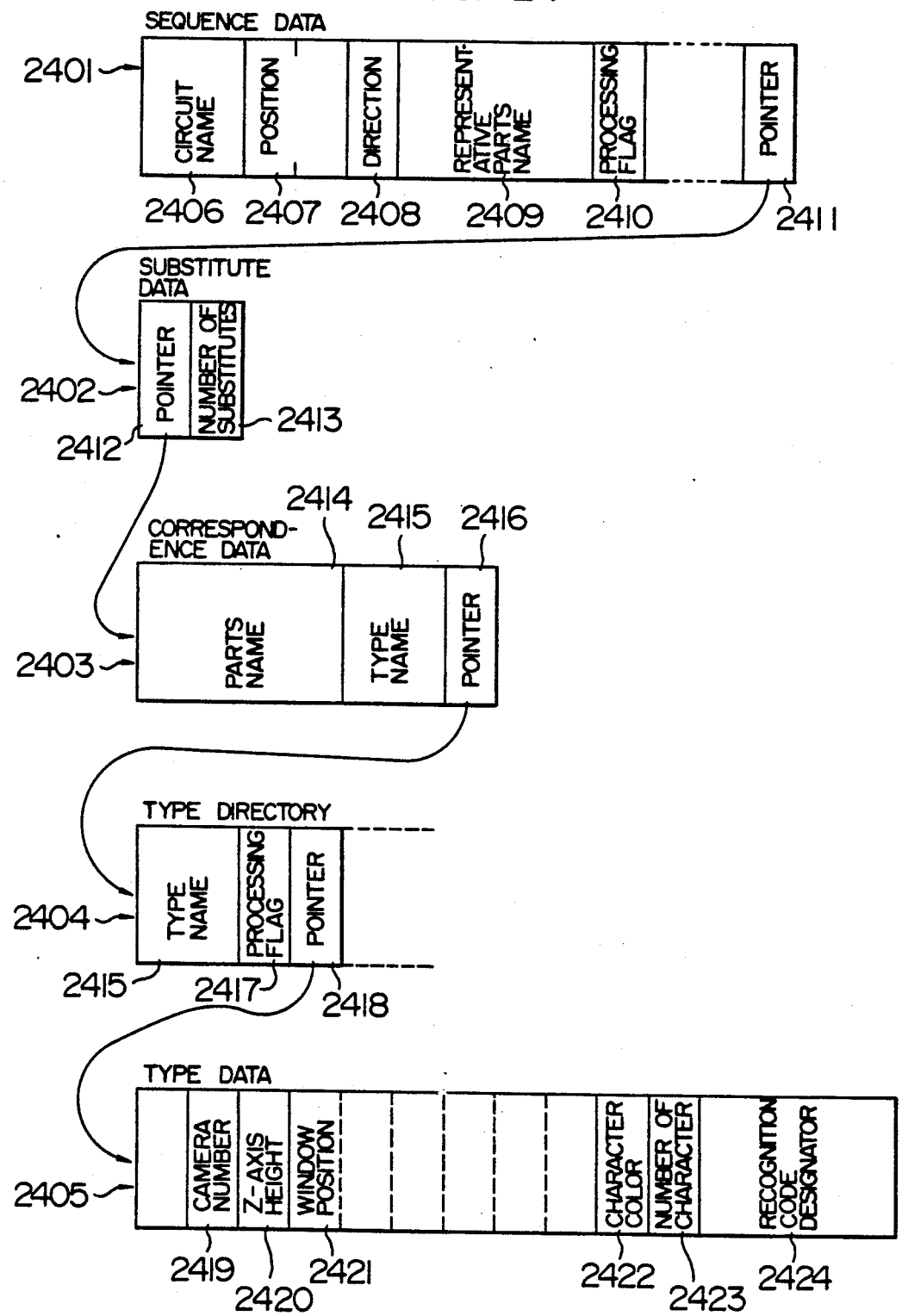
FIG. 24 shows data format for an example of recognition control code data which is preliminarily set for character read/collation.
Figure 27B:
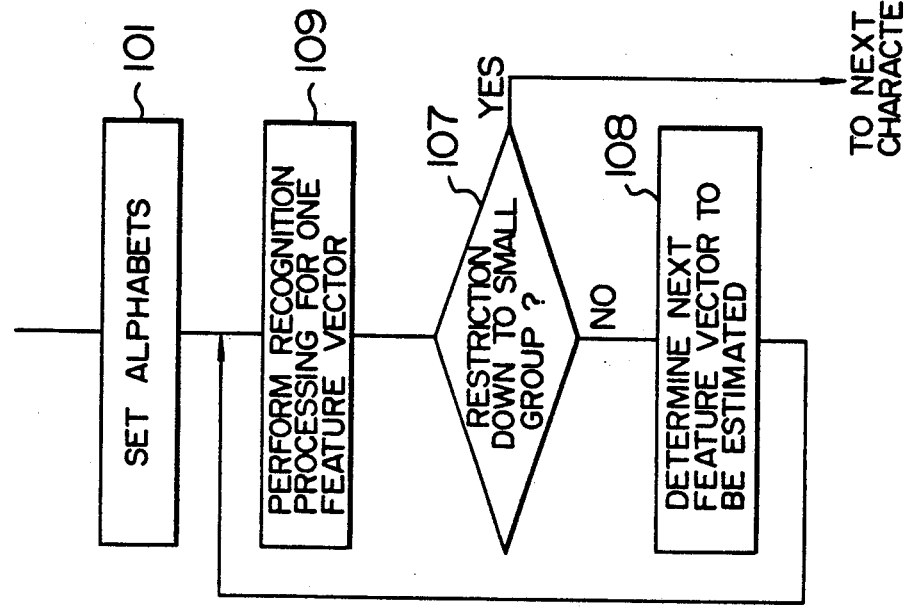
FIGS. 27A and 27B are flow charts for explaining examples of character recognition processings depending upon different recognition code designators.
Figure 27A:
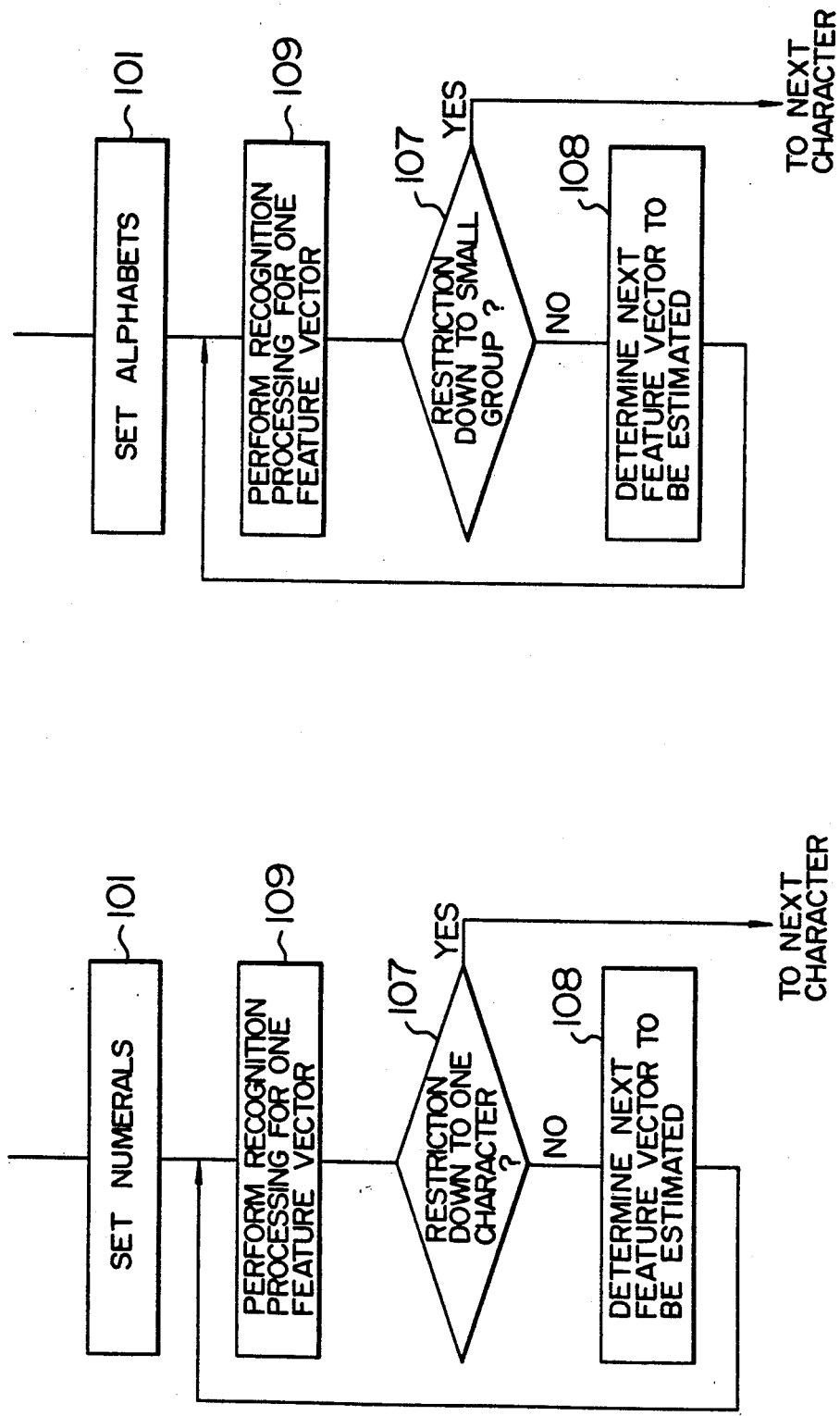

Finally, a read/collation processing will be explained, the read/collation processing is performed in accordance with recognition control code data preliminarily determined in correspondence to each type of an object to be recognized. A data format of the recognition control code data is shown in FIG. 24. The recognition control code data includes sequence data 2401, substitute data 2402, correspondence data 2403, type directory 2404 and type data 2405. This data is constructed such that it can be easily altered with the alteration of a substrate to be inspected and overlapping data is not included in order to minimize the amount of data. The sequence data 2401 and the substitute data 2402 are produced from NC data or the like upon parts placement, and the correspondence data 2403 as data of each parts and the type directory 2404 and type data 2405 as data corresponding to each type of parts are preliminarily produced. This data is preliminarily chained by pointers prior to execution of an inspection processing, thereby allowing a rapid read and collation processing. More particularly, a row of characters on an IC substrate or the like to be inspected is recognized on the basis of data classified corresponding to the assortment of types. The type classification data is generally divided into sequence data 2401, correspondence data 2403 and type data 2405. In order to chain these data with each other there provided substitute data 2402 and a type directory 2404. The sequence data 2401 is produced from design data for the arrangement of parts on a substrate and is composed of a circuit name 2406 of each of the parts, position 2407, direction 2408, representative (or typical) parts name 2409, processing flag 2410 and pointer 2411 to the substitute data. The processing flag 2401 is a flag indicative of whether or not a character read/collation processing should be performed for the part specified by the sequence data 2401 and may further include a flag(s) indicative of whether or not another processing(s) (for example, judgement of polarity) is required. The substitute data 2402 is provided for coping with the case where a plurality of substitutes for a specific circuit are permitted and is composed of pointer 2412 to the correspondence data 2403 and the number 2413 of substitutes. From the substitute data 2402 pointed to by the sequence data 2401 it can be recognized that substitutes the number of which is equal to the number 2413 of substitutes in the substitute data 2402 is permitted. The correspondence data 2403 are provided corresponding to the substitutes. The correspondence data 2403 indicates one of the classification types to which the corresponding substitute or parts belongs and is composed of type name 2415 and pointer 2416 to the type directory 2404. The type directory 2404 is a directory to the type data 2405 necessary for each processing (such as character read/collation or polarity judgement) and is composed of type name 2415, processing flag 2417 and pointer 2418 to the type data 2405. The type data 2405 is data necessary for character read/collation classified corresponding to each parts type and is composed of camera number 2419 when a plurality of TV cameras are used, Z-axis height 2420, processing window position 2421 for the window establishing step 403 (see FIG. 4), character color 2422, the number 2423 of characters and recognition code designator 2424. Accordingly, the type data 2405 is provided for allowing easier recognition of the row of characters. The sequence data 2401 and the substitute data 2402 among the above classification data are produced on the basis of external data (such as CAD data) each time the kind of a substrate to be inspected is altered, and the other data are preliminarily stored in the hard disk 306. Only necessary portions of those data are fetched or taken out prior to execution of the read/collation processing and are used after a chain relation between the data has been clarified by pointers.

The recognition code designators will now be explained in detail. The recognition code designators are provided for reflecting, for recognition, information concerning the kind of characters (such as alphabets, numerals or symbols), the importance, the read priority, etc. of a character(s) in a character row representative of a parts name. Designators for designating the kind of a character may be, for example, an alphabet designating designator, a numeral designating designator, a symbol designating designator and an alphanumeric character designating designator. Each of these designators contains information of whether a character to be read is an alphabet, a numeral or another kind of character and limits the kind of characters to be set in the step 101 (see FIG. 1) in which candidate characters are initially set. Thereby, it is possible to reduce the number of candidate characters and to reduce the number of times of the subsequent processings for comparison with dictionary data, thereby providing a high-speed performance. Further, the contents of a processing in the step 108 (see FIG. 1) in which the next feature vector to be estimated is determined can be determined taking a processing characteristic of numerals or a processing characteristic of alphabets into consideration, thereby providing stabilized recognition. A designator for designating the importance of a character designates either the restriction down to one character or the restriction down to a small group or several characters. This designator clearly designates whether or not the character to be read is an important character in a character row including that character, for example, whether or not the character is that portion of a character row representative of a parts name which indicates the type of that part. The importance designating designator can be used to establish the conditions for completion in the step 107 (see FIG. 1) in which the completion of the processing is judged. For the important portion of the character row, a recognition processing for one feature vector is repeated until candidate characters are restricted down to one specified character. For the other portion thereof, a recognition processing for one feature vector is terminated at the point of time when the number of candidate characters have been restricted down to a predetermined number. This designation of the importance makes it possible not only to reduce the possibility that erroneous recognition may be made by a forced judgement in the case where the restriction from specific candidate characters is difficult but also to reduce the number of processing steps, thereby providing a high-speed processing. A designator for designating the priority for reading of characters may be, for example, a designator designating characters indicative of a company name. Such a designator can be used to read first of all that portion of a character row to be read which indicates the company name preferentially designated by that designator, thereby allowing the early completion of the processing in the case where anti-coincidence is detected or the early alteration to the substitute data.

As recognition code designators mentioned in the above, recognition code designators such as H, h, N, n, A, a, S and so on, as shown in FIG. 25, are established. They are set as recognition code designators for respective characters in a character row which is shown in FIG. 26 by way of example. A recognition processing for one character takes either the processing shown in FIG. 27A or the processing shown in FIG. 27B depending upon the set recognition code designator 2601. For example, when the recognition code designator N is set, numerals are set in step 101 for initially setting candidate characters and an affirmative condition in a completion judging step 107 is that the number 2201 of candidate characters is 1 (one) or that the estimated distance 2203 of the most resemble character is greater than a predetermined value (in the latter case, the determination as an unrecognizable character is made). When the recognition code designator a is set, alphabets are set in step 101 for initially setting candidate characters and an affirmative condition in a completion judging step 107 is that the number 2201 of candidate characters is 2 to 3 (or a small group) or that the estimated distance 2203 of the most resemble character is greater than a predetermined value.

Figure 28:
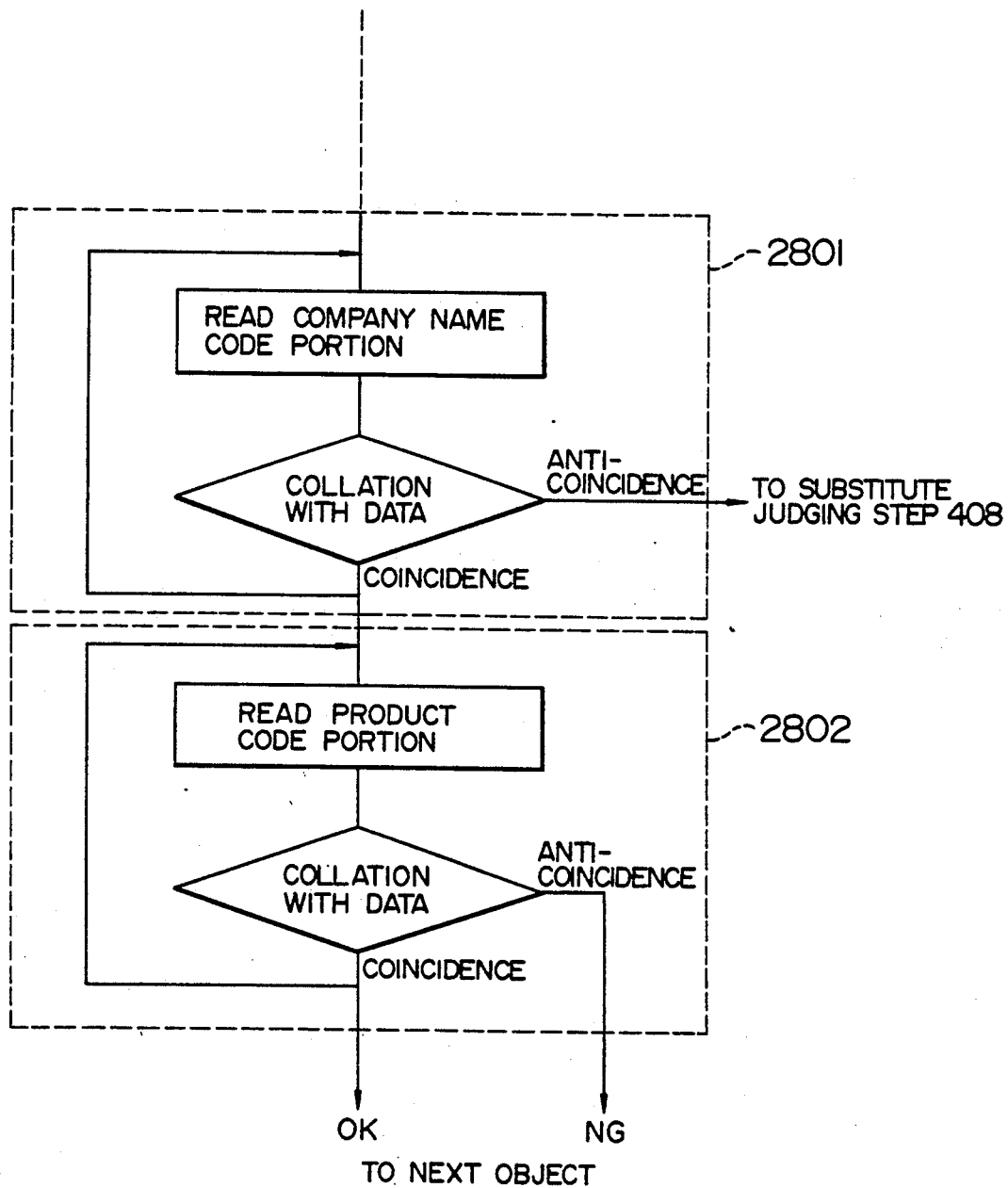
FIG. 28 is a flow chart of an example of a read/collation processing in the case where a recognition code designator is set.

FIG. 28 illustrates a flow of the read/collation processing 410 (see FIG. 4). First, a portion (a company name portion to which the designator H or h is set) the priority for read of which is designated is read and is compared with the parts name 2414 in the correspondence data 2403 (priority-designated portion read/collation processing 2801). In the case of anti-coincidence, the flow proceeds to the substitute judging step 408 (see FIG. 4). On the other hand, in the case of coincidence, the other portion (or a portion indicating a product code or the like) is read (undesignated portion read/collation processing 2802). At this time, the judgement of coincidence/anti-coincidence is made for one character. At the point of time when the anti-coincidence is detected, the recognition is finished and the flow proceeds immediately to the next object since it is not necessary to perform the substitute judging step 408.

As is apparent from the foregoing, the present invention provides the following effects.

(1) A smaller dictionary capacity suffices for a variety kinds of fonts and high-speed and stable recognition can be realized even for a broken or swelled character(s) to be recognized, since the features of a character are represented as vectors, a feature vector extracted from a character to be recognized and a preliminarily prepared dictionary vector are compared, and a processing of excluding from a candidate character group a candidate character having its dictionary vector away from the extracted feature vector by a distance not smaller than a predetermined value is performed for each of a plurality of feature vectors so that the ultimately remaining candidate character is employed as a result of recognition and since a dictionary vector is defined as an average vector for a plurality of characters having a variety of character fonts, a difference of the dictionary vector from a feature vector extracted from a character to be recognized is estimated by virtue of a dictionary deviation vector, and candidate characters are restricted by use of the accumulation of estimated values over plural kinds of feature vector.

(2) Collation with a plurality of character data can be performed with a high speed in such a manner that in reading a character row for collation thereof with some character rows previously held as data, the collation is preferentially made to a specified portion of the character row so that the read/collation of the other portion of the character row is made only in the case where the result of collation of the specified portion is affirmative.

(3) The prevention of erroneous recognition of a similar character as a character of interest and a high-speed processing can be realized in such a manner that in recognizing a character through the restriction of candidate characters by a plurality of kinds of feature vectors, the recognition is completed at the point of time when the candidate characters have been restricted down to specified candidate characters.

(4) A high-speed processing can be realized in such a manner that in recognizing a character with restricted candidate characters, the recognition is made after the candidate characters were preliminarily specified.

(5) A high-speed processing and the stabilization of recognition can be realized by designating the preferential collation to a specified portion, the restriction of candidate characters and/or the completion of recognition at the stage of the restriction down to specified candidate characters with respect to a character row to be read.

(6) The brightness of a character(s) relative to a background can be automatically determined by producing a histogram for brightness in a window, determining a peak point and two skirts of the brightness histogram and discriminating as a character region a histogram region which extends on the side of one of the two skirts far away from the peak point.

(7) A two-dimensional image in an window can be optimally binarized by connection a peak point of a histogram for brightness in the window and one of two skirts of the histogram far away from the peak point by a straight line and determining a point on the histogram farthest from the straight line as a threshold value for binarization.

(8) The extraction of characters can be performed with no influence of the inclination of a row of characters by dividing a window into a plurality of sections in a character width direction at intervals of about integral times of a character width, producing a projection distribution for the frequency of appearance of character pixels of a binary image to the character width direction for each divisional section, and determining from the projection distribution a character existing position or region in a character height direction for each divisional section.

(9) The character extraction can be stably performed by examining a relation between the character existing regions determined by the method of the above item (8) and division points in the character width direction to correct a portion unconformable to the inclination of the other portion, thereby correcting any error in extraction of the character existing region.

(10) By producing a projection distribution for the frequency of appearance of character pixels of the binary image to the character height direction for only the character existing region determined by the method of the above item (8), the extraction of characters in the character width direction can be stably performed.

(11) The extraction of characters in the character width direction can be stably performed even for a broken character(s) by extracting character groups from the projection distributions to the character height direction produced by the method of the above item (10) in accordance with a predetermined threshold value to incorporate an extremely small group, if any, into a neighboring large group.

(12) The character extraction in the character width direction can be stably performed even for a swelled character(s) by extracting a group much larger than a character width from the groups extracted from the projection distributions in the above item (11), estimating the number of characters included in the larger group to determine virtual division points and searching for the minimum value in the vicinity of the virtual division point to determine it a true division point or a correct extraction position.

We claim:

1. A character recognition method of recognizing a typical character, including an alphanumeric character or a symbol, by two-dimensionally imaging the character, storing the two-dimensional image as image data and subjecting the stored image data to an image processing; comprising the steps of:

extracting different kinds of feature vectors from the two-dimensional image of the character to be recognized;

comparing one of the extracted different kinds of feature vectors with a dictionary vector for each candidate character in a group of candidate characters preliminarily prepared to determine a distance between the dictionary vector and the one kind of feature vector;

estimating the distance determined by said comparing step to exclude from the candidate character group a candidate character having its dictionary vector spaced from the one kind of feature vector by a distance not smaller than a predetermined value;

repeating said comparing and estimating steps for each of the remaining kinds of feature vectors until the number of candidate characters included in said candidate character group becomes equal to or smaller than a predetermined value; and identifying the character to be recognized on the basis of restricted candidate characters obtained as a result of said repeating step.

2. A character recognition method according to claim 1, further comprising a step of storing as the dictionary vector of each candidate character an average feature vector for a variety of fonts and a deviation feature vector for the variety of fonts.

3. A character recognition method according to claim 2, wherein said comparing step includes a substep of calculating a difference between said average feature vector of the dictionary vector and said extracted feature vector, and said estimating step includes a substep of estimating the distance calculated by said calculating substep by reference to said deviation feature vector of the dictionary vector to produce a cumulative estimated value each time said repeating step is carried out.

4. A character recognition method according to claim 3, wherein said estimating step determines a candidate character to be excluded from said candidate character group on the basis of said cumulative estimated value.

5. A character recognition method in which a typical character indicated is recognized by an image processing after two-dimensional imaging of the character and the storage thereof as image data, comprising the steps of:
 comparing one of plural kinds of feature vectors extracted from the character to be recognized and a dictionary vector of each candidate character in a group of candidate characters preliminarily prepared to determine a distance between the one kind of feature vector and the dictionary vector;
 estimating said distance to exclude from the candidate character group a candidate character having its dictionary vector spaced from the one feature vector by a distance not smaller than a predetermined value;
 repeating said comparing and estimating steps for each of the remaining kinds of feature vectors until the number of candidate characters in said candidate character groups becomes equal to or smaller than a predetermined value; and
 recognizing the character to be recognized on the basis of restricted candidate characters obtained as a result of said repeating step.

6. A character recognition method according to claim 5, wherein the dictionary vector of each of said candidate characters is defined as an average vector for a variety of fonts, the distance between the feature vector extracted from the character to be recognized and the dictionary vector determined in said comparing step is estimated in said estimating step by virtue of a deviation vector for the variety of fonts to produce an estimated value, and the exclusion from said candidate character group in said estimating step is judged on the basis of the estimated values each of which is cumulatively produced each time said estimating step is made.

7. A character recognition method according to claim 5, wherein the character to be recognized is indicated in plural as a character row which is to be recognized in units of one character through said comparing, estimating, repeating and recognizing steps, and said recognizing step includes collating the recognized character row with each of character rows preliminarily held as reference data, preferential recognition and collation being made to a specified portion of said character row while the recognition and collation to the remaining portion of said character row is made only when the result of collation of the specified portion with the held reference data is affirmative.

8. A character recognition method according to claim 5, wherein said repeating step is terminated at the point of time when the candidate characters have been considerably restricted by the exclusion from said candidate character group at said estimating step.

9. A character recognition method according to claim 5, wherein said group of candidate characters is preliminarily limited to a group of characters of a specified kind.

10. A character recognition method according to claim 5, the recognition of the character is made in accordance with a recognition code designator.

11. A character recognition method according to claim 5, wherein the character to be recognized may be indicated in plural as a character row, and said method further comprises a step of establishing a window to embrace the character or character row to be recognized, a step of processing a multi-valued two-dimensional image of the character row in said window to produce a histogram for brightness in said window, and a step of determining a peak point and two skirts of the brightness histogram to discriminate as the brightness of a background of the character row a portion of said brightness histogram around said peak point and as the brightness of the character row itself a portion of said brightness histogram which extends on the side of one of said two skirts far away from said peak point.

12. A character recognition method according to claim 5, wherein the character to be recognized may be indicated in plural as a character row, and said method further comprises a step of establishing a window to embrace the character row to be recognized, and a step of binarizing a many-valued two-dimensional image of the character row in said window by determining a peak point and two skirts of a histogram for brightness in said window, connecting said peak point and one of said two skirts far away from said peak point by a straight line and defining a threshold value for binarization on the basis of the brightness at a point on the brightness histogram farthest from said straight line.

13. A character recognition method according to claim 12, further comprising a step of extracting the characters in a character height direction from a binary two-dimensional image in said window obtained by said binarizing step and said character extracting step includes dividing said binary two-dimensional image into a plurality of sections in a character width direction at intervals equal to or greater than one time of a character width, producing a projection distribution for the frequency of appearance of character pixels of a binary image to the character width direction for each divisional section, and determining a character existing position in the character height direction from the projection distribution for each divisional section.

14. A character recognition method according to claim 13, wherein the character existing position in the character height direction determined for each divisional section is approximated on the assumption that it lies between two parallel straight lines which are established in said window on the basis of said character existing position.

15. A character recognition method according to claim 13, wherein the extraction in the character height direction in each divisional section is made by approximate straight lines established on the basis of two parallel straight lines, and a projection distribution for the frequency of appearance of character pixels of a binary image to the character height direction is produced in each divisional section to extract the character row in the character width direction on the basis of the projection distribution.

16. A character recognition method according to claim 15, wherein the extraction of the character row in the character width direction is made by dividing the projection distributions to the character width direction produced for the divisional sections into a plurality of groups in the character width direction in accordance with a predetermined small threshold value while dividing virtually and equally an area from a group start point of the leading group of the groups and a group end point of the tailing group of the groups into a plurality of regions in accordance with the presumed number of characters, whereby in each divisional region a narrower group having a width smaller than a predetermined width, if any, is incorporated into a wider group which has a width not smaller than said predetermined width and exists in the vicinity of said narrower group and on the side of one two virtual division points on opposite sides of said narrower group which is far away from said narrower group.

17. A character recognition method according to claim 16, wherein if a group having a width greater than a character width is extracted from the groups after the incorporation processing, the number of characters included in that group is estimated and that group is virtually and equally segmented in accordance with the estimated number of characters to thereby define the minimum point existing in the vicinity of each segmentation point as a new character extraction point in the character width direction.

18. A character recognition system for recognizing a typical character including an alphanumeric character or a symbol by two-dimensionally imaging the character, storing the two-dimensional image as image data and subjecting the stored image data to an image processing, comprising:

extracting means for extracting a plurality of kinds of feature vectors from a two-dimensional image of the character to be recognized;

comparing means coupled with said extracting means for comparing one of the extracted plural kinds of feature vectors with a dictionary vector for each candidate character in a group of candidate characters preliminarily prepared to determine a distance between the dictionary vector and said one kind of feature vector;

estimating means responsive to said comparing means for estimating said distance to exclude from the candidate character group a candidate character having its dictionary vector spaced from the one feature vector by a distance not smaller than a predetermined value;

controlling means for repeating the operations of said comparing means and said estimating means for each of the remaining kinds of feature vectors until the number of candidate characters n said candidate character group becomes equal to or smaller than a predetermined value; and identifying means coupled with said controlling means and said estimating means for identifying the character to be recognized on the basis of restricted candidate characters obtained by the operation of said controlling means.

19. A character recognition system according to claim 18, further comprising a memory for storing as the dictionary vector of each candidate character an average feature vector for a variety of fonts and a deviation feature vector for the variety of fonts.

20. A character recognition system according to claim 19, wherein said comparing means includes means for calculating a difference between said average feature vector of the dictionary vector and said extracted feature vector, and said estimating means includes means for estimating the distance calculated by said calculating means by reference to said deviation feature vector of the dictionary vector to produce a cumulative estimated value each time the operations of said comparing means and said estimating means are repeated.

* * * * *